(12) United States Patent
Sasaki

(10) Patent No.: US 10,999,567 B2
(45) Date of Patent: May 4, 2021

(54) IMAGE GENERATING APPARATUS AND IMAGE GENERATING METHOD

(71) Applicant: SONY INTERACTIVE ENTERTAINMENT INC., Tokyo (JP)

(72) Inventor: Nobuo Sasaki, Kanagawa (JP)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 0 days.

(21) Appl. No.: 16/629,887

(22) PCT Filed: Aug. 1, 2017

(86) PCT No.: PCT/JP2017/027921
§ 371 (c)(1),
(2) Date: Jan. 9, 2020

(87) PCT Pub. No.: WO2019/026184
PCT Pub. Date: Feb. 7, 2019

(65) Prior Publication Data
US 2020/0177859 A1    Jun. 4, 2020

(51) Int. Cl.
*H04N 13/117* (2018.01)
*H04N 13/167* (2018.01)
(Continued)

(52) U.S. Cl.
CPC ........... *H04N 13/117* (2018.05); *H04N 13/15* (2018.05); *H04N 13/156* (2018.05);
(Continued)

(58) Field of Classification Search
None
See application file for complete search history.

(56) References Cited

U.S. PATENT DOCUMENTS

| 2014/0066178 A1* | 3/2014 | Kelly ................. G07F 17/3241 463/25 |
| 2017/0230644 A1 | 8/2017 | Takizawa et al. |

FOREIGN PATENT DOCUMENTS

| JP | 04-184683 A | 7/1992 |
| JP | 2006-197036 A | 7/2006 |

(Continued)

OTHER PUBLICATIONS

International Preliminary Report on Patentability dated Feb. 13, 2020, from International Application No. PCT/JP2017/027921, 12 sheets.

(Continued)

*Primary Examiner* — Christopher Braniff
(74) *Attorney, Agent, or Firm* — Katten Muchin Rosenman LLP

(57) ABSTRACT

When a predetermined condition based on an instruction input from a user or a change in a posture of the user is satisfied (N in S300), an original image manipulating section of an image generating apparatus acquires amounts of displacement of viewpoints of a viewer from base points with respect to an image stereoscopically viewed by the user on the basis of display of left and right parallax images (S302). On the basis of the amounts of displacement, the original image manipulating section acquires the amount of adjustment of the position of an image plane in a virtual space in which the parallax images are expressed (S304). In generating, from each pixel on the image plane, an image reference vector for referencing the original images of the parallax images, the original image manipulating section executes calculation reflecting the amount of adjustment of the position of the image plane to achieve adjustment of the position of the image plane (S306).

7 Claims, 29 Drawing Sheets

(51) Int. Cl.
*H04N 13/156* (2018.01)
*H04N 13/366* (2018.01)
*H04N 13/15* (2018.01)
*H04N 13/324* (2018.01)

(52) U.S. Cl.
CPC ......... *H04N 13/167* (2018.05); *H04N 13/324* (2018.05); *H04N 13/366* (2018.05)

(56) References Cited

FOREIGN PATENT DOCUMENTS

| | | | |
|---|---|---|---|
| JP | 2007-052304 A | 3/2007 |
| JP | 2012-080294 A | 4/2012 |
| JP | 2013-143702 A | 7/2013 |
| JP | 2016-092512 A | 5/2016 |

OTHER PUBLICATIONS

International Search Report and Written Opinion dated Oct. 24, 2017, from International Application No. PCT/JP2017/027921, 9 sheets.

Katayama, Akihito et. al., A Viewpoint Dependent Stereoscopic Display Using Interpolation of Multi-Viewpoint Images Proceedings of SPIE, vol. 2409, Mar. 30, 1995, p. 17-18.

* cited by examiner

IMAGE GENERATING APPARATUS AND IMAGE GENERATING METHOD

TECHNICAL FIELD

The present invention relates to an image generating apparatus and an image generating method for generating stereoscopic videos.

BACKGROUND ART

Three-dimensional display devices such as three-dimensional televisions and head-mounted displays have been utilized that are capable of stereoscopically presenting videos. Devices have also been developed that are capable of stereoscopically presenting videos on portable terminals such as cellular phones and portable game machines. This has led to an increase in opportunities for general users to view stereoscopic videos.

A three-dimensional display device displaying stereoscopic videos enable a user to stereoscopically view an image by causing the left and right eyes of the user to view respective images with parallaxes. Methods for causing the left and right eyes to view respective images with parallaxes include the use of special optical glasses and the use of a parallax barrier or a lenticular lens instead of the optical glasses.

SUMMARY

Technical Problems

To cause the user to view undistorted stereoscopic videos, accurate parallax images based on the viewpoint of the user need to be generated. Thus, to present stereoscopic videos while permitting movement of the viewpoint, for example, processing is generally needed in which an object is placed in a virtual three-dimensional space and in which the object is projected with a camera coordinate system changed. However, pursue of the quality and accuracy of images leads to an increase in time needed for the processing. This in turn makes display difficult to follow movement of the viewpoint. Additionally, many manipulations are applied to the data of the original parallax image, leading to an increase in the likelihood of degradation of the image.

In view of these problems, an object of the present invention is to provide a technique capable of generating a high-quality stereoscopic image with reduced delay in spite of displacement of the viewpoint.

Solution to Problems

A certain aspect of the present invention relates to an image generating apparatus. The image generating apparatus is an image generating apparatus using a pair of original images acquired from left and right different viewpoints to generate an image making an object stereoscopically visible, the image generating apparatus including an original image manipulating section adjusting a position of an image plane in a virtual space according to movement of viewpoints of a user and calculating displacement of pixels in the original images such that the object is fixed in the virtual space with respect to movement of the viewpoint to generate, on the image plane, an image corresponding to the viewpoints at each of points in time, a display image generating section referencing, in the image corresponding to the viewpoints at each of the points in time, a color value at a position corresponding to each of the pixels in a display image to determine the color value for the pixel, and an output section outputting data of the display image.

Another aspect of the present invention relates to an image generating method. The image generating method is an image generating method using a pair of original images acquired from left and right different viewpoints to generate an image making an object stereoscopically visible, the image generating method including a step of adjusting a position of an image plane in a virtual space according to movement of viewpoints of a user and calculating displacement of pixels in the original images such that the object is fixed in the virtual space with respect to movement of the viewpoint to generate, on the image plane, an image corresponding to the viewpoints at each of points in time, a step of referencing, in the image corresponding to the viewpoints at each of the points in time, a color value at a position corresponding to each of the pixels in a display image to determine the color value for the pixel, and a step of outputting data of the display image.

Note that valid aspects of the present invention include an optional combination of the above-described components and the expression of the present invention converted between the method, the apparatus, and the like.

Advantageous Effect of Invention

According to the present invention, a high-quality stereoscopic image can be presented with reduced delay in spite of displacement of the viewpoint.

DESCRIPTION OF EMBODIMENT

The present embodiment relates to a three-dimensional image display system causing a right-eye image to reach the right eye while causing a left-eye image to reach the left eye of parallax images for stereoscopic viewing. In this case, an image display configuration and a viewing configuration for a viewer are not limited. For example, in a possible aspect, parallax images are simultaneously or alternately displayed on a flat panel display or a screen and viewed using polarized glasses or shutter spectacles. Alternatively, a head-mounted display capable of independently presenting images to the left and right eyes may be utilized. Here, the latter will be mainly described.

Figure 1:
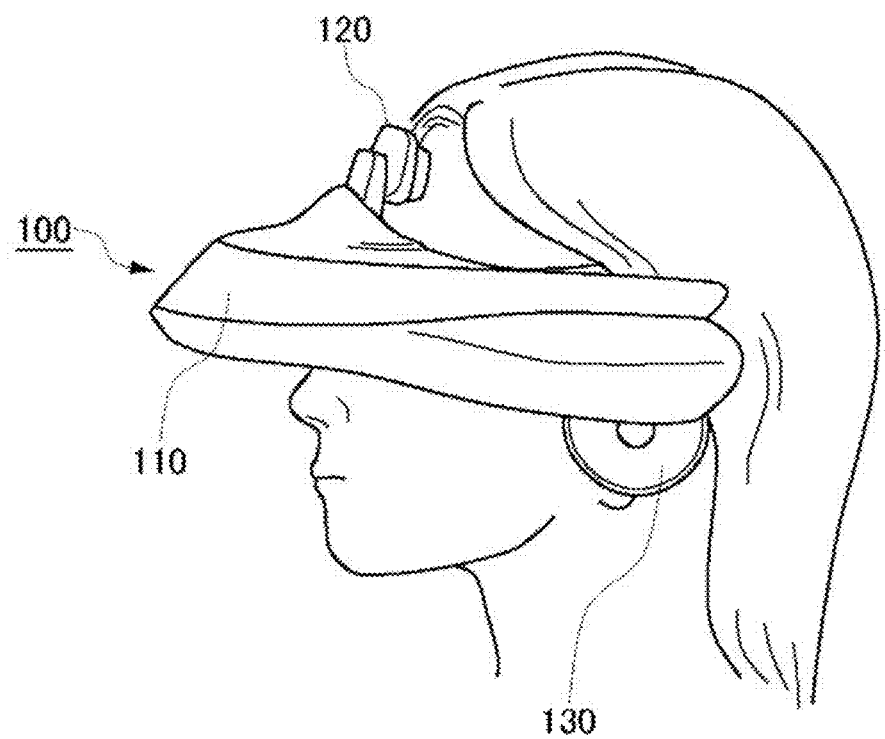
FIG. 1 is an appearance diagram of a head-mounted display according to the present embodiment.

FIG. 1 is an appearance diagram of a head-mounted display 100. The head-mounted display 100 includes a main body section 110, a front head contact section 120, and a side head contact section 130. The head-mounted display 100 is a display apparatus mounted on the head of a viewer to allow the viewer to view still images, moving images, and the like and to listen to sound, music, and the like output from a headphone. A motion sensor built in or externally installed on the head-mounted display 100 is capable of measuring posture information such as the rotation angle and inclination of the head of the viewer wearing the head-mounted display 100.

Figure 2:
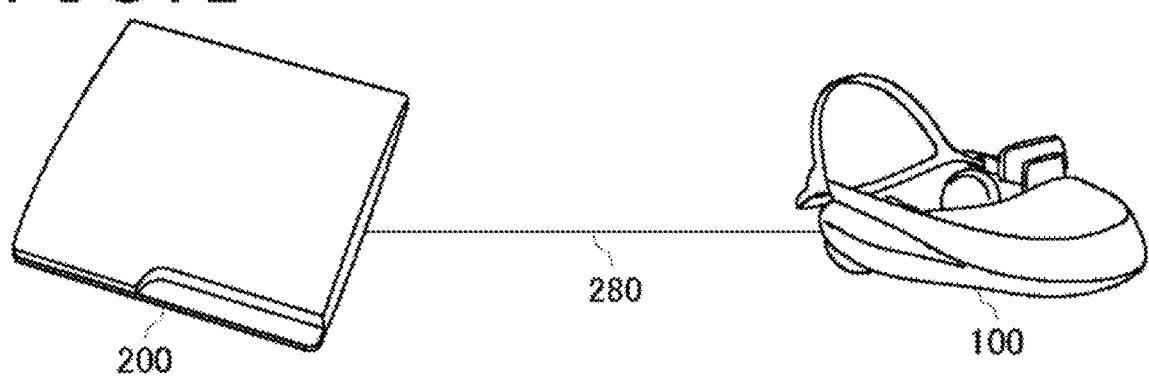
FIG. 2 is a configuration diagram of an image display system according to the present embodiment.

FIG. 2 is a configuration diagram of an image display system according to the present embodiment. The head-mounted display 100 is connected to an image generating apparatus 200 via wireless communication or an interface 280 to which peripheral equipment such as a universal serial bus (USB) is connected. The image generating apparatus 200 may further be connected to a server via a network. In that case, the server may provide, to the image generating apparatus 200, an online application such as a game that can be joined by a plurality of users via the network. The image generating apparatus 200 may be any of a game apparatus, a personal computer, and a portable terminal. Additionally, the image generating apparatus 200 and the head-mounted display 100 may be integrated together.

Figure 3:
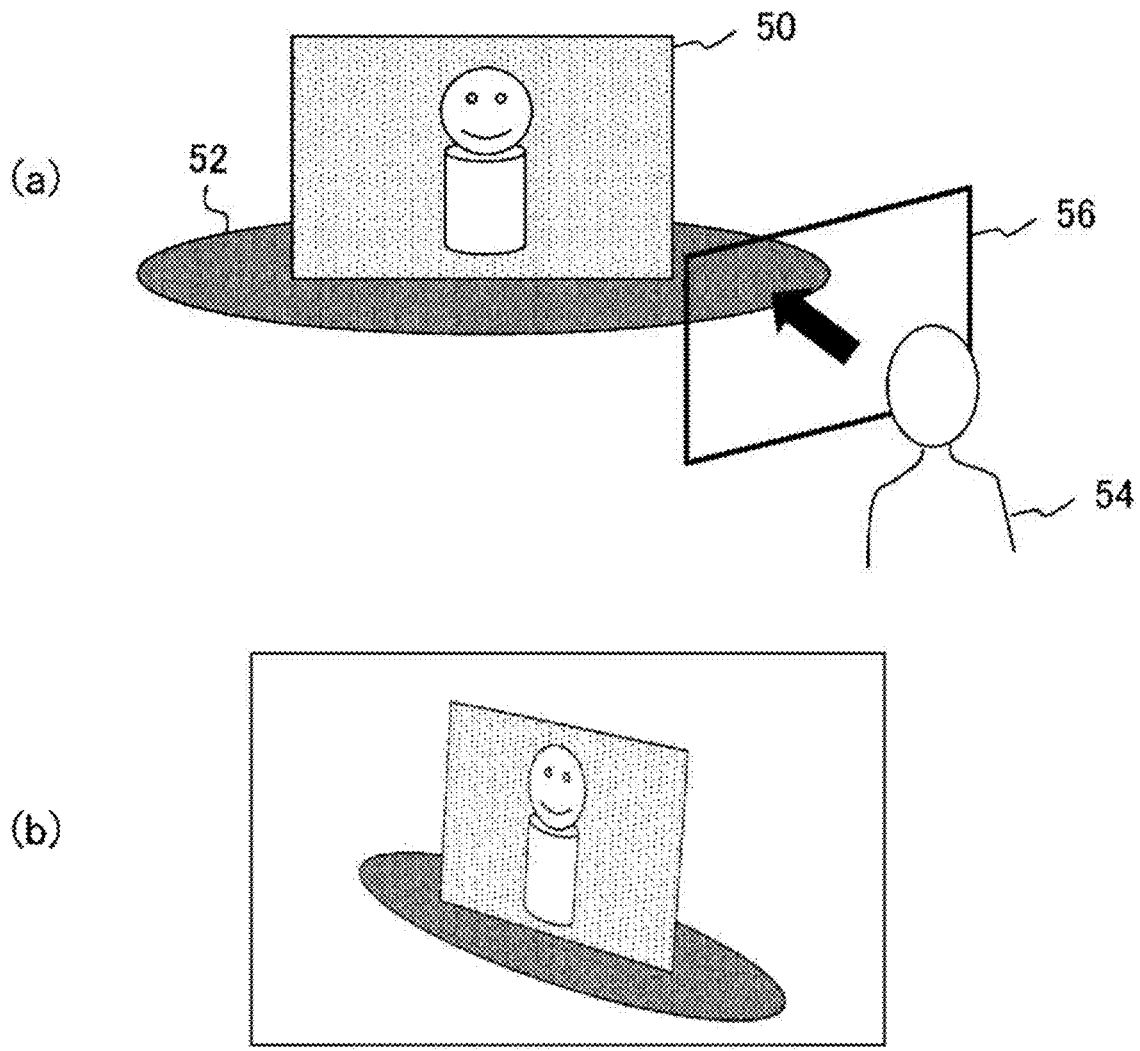
FIG. 3 is a diagram illustrating an aspect of display implemented by the image display system of the present embodiment.

FIG. 3 is a diagram illustrating a display configuration implemented by the image display system. In the present embodiment, a state is created in which a plane expressing an image is further disposed in a virtual space. That is, conceptually, as illustrated in (a), a screen on which an image is displayed is disposed in a field 52 in the virtual space, and a viewer 54 can view the image via a view screen 56. Here, the view screen 56 corresponds to a visual field for the image displayed on the head-mounted display 100.

As the viewer 54 moves while viewing the virtual space, a manner in which the screen 50 is viewed varies according to a variation in a position relative to the virtual world. For example, as illustrated in (a), in a case where the viewer 54 is on the right side of the screen 50, the image generating apparatus 200 generates an image like (b) corresponding to a line of sight as illustrated by an arrow. Note that the field 52 in the virtual space only expresses a coordinate system for the virtual space and is not intended to limit the shape of the field 52 or the like. Additionally, the field 52 need not necessarily be displayed.

Figure 4:
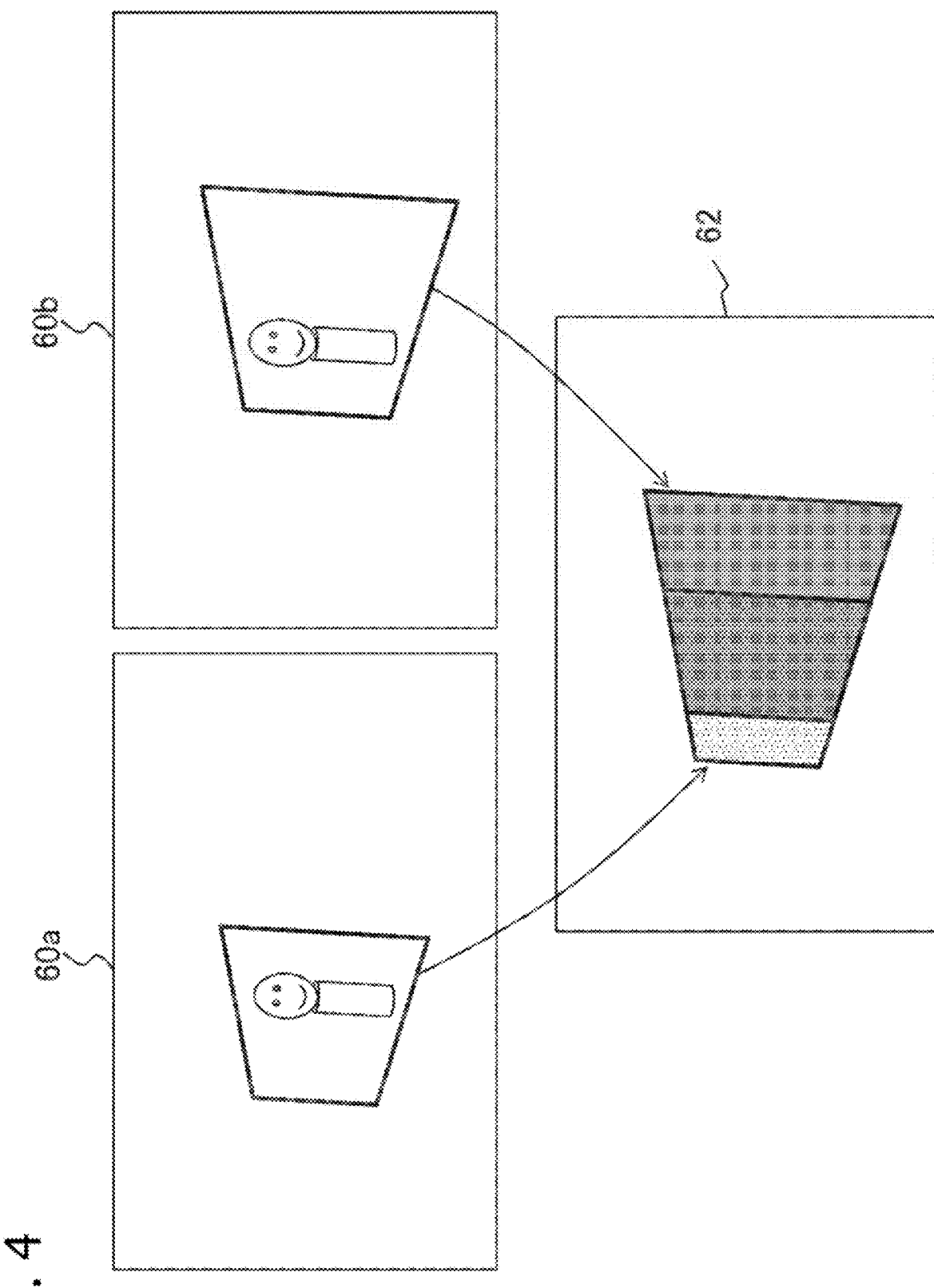
FIG. 4 is a diagram schematically illustrating an image generated by an image generating apparatus of the present embodiment.

FIG. 4 schematically illustrates an image generated by the image generating apparatus 200 to implement an aspect in FIG. 3. In the present embodiment, an image displayed on the image screen 50 includes a pair of parallax images for stereoscopic viewing, that is, a left-eye image 60a and a right-eye image 60b. For stereoscopic viewing of an image as illustrated in FIG. 3, the same object is expressed on the left-eye image 60a closer to a right end of the image and on the right-eye image 60b closer to a left end of the image.

Additionally, the position of the viewpoint with respect to the image screen 50 varies between the right eye and the left eye, and thus perspective transformation needs to be performed from each viewpoint. For example, in a case where the viewer is on the right side with respect to the image screen 50 as illustrated in FIG. 3, the right eye is closer to the image screen 50 than the left eye and has a larger angle with respect to an axis perpendicular to the plane of the image screen 50. As a result, the shape and position of the frame of the image screen 50 vary between the left-eye image 60a and the right-eye image 60b. Superimposed expression of the left-eye image 60a and the right-eye image 60b on the same plane leads to a position relationship as illustrated in the plane 62.

The left-eye image 60a and the right-eye image 60b as described above are generated. The left-eye image 60a is displayed on one of the areas into which the screen of the head-mounted display 100 is laterally divided, the one corresponding to the left eye, and the right-eye image 60b is displayed on the area corresponding to the right eye. The viewer can stereoscopically view an object expressed on the image screen in a state illustrated in FIG. 3(b). Note that a lens is actually provided between the screen of the head-mounted display 100 and the eyes of the viewer to express the image all over the visual field of the left and right eyes. Thus, a lens distortion correction is performed on each of the right-eye image 60b and the left-eye image 60a such that the original image is viewed via the lens.

As described above, the present embodiment implements an aspect in which parallax images for stereoscopic viewing are prepared and can be viewed at a free viewpoint. In a technique for allowing a virtual space to be stereoscopically viewed, a virtual world is defined in a three-dimensional space, and an object in the virtual world is projected on the view screen corresponding to the left and right viewpoints of the viewer to generate parallax images. On the other hand, in a case where a previously captured or generated two-dimensional image is stereoscopically viewed as in a three-dimensional moving image, parallaxes are originally provided, and thus the viewpoint of the viewer is limited in a case where the image remains unchanged.

Figure 5:
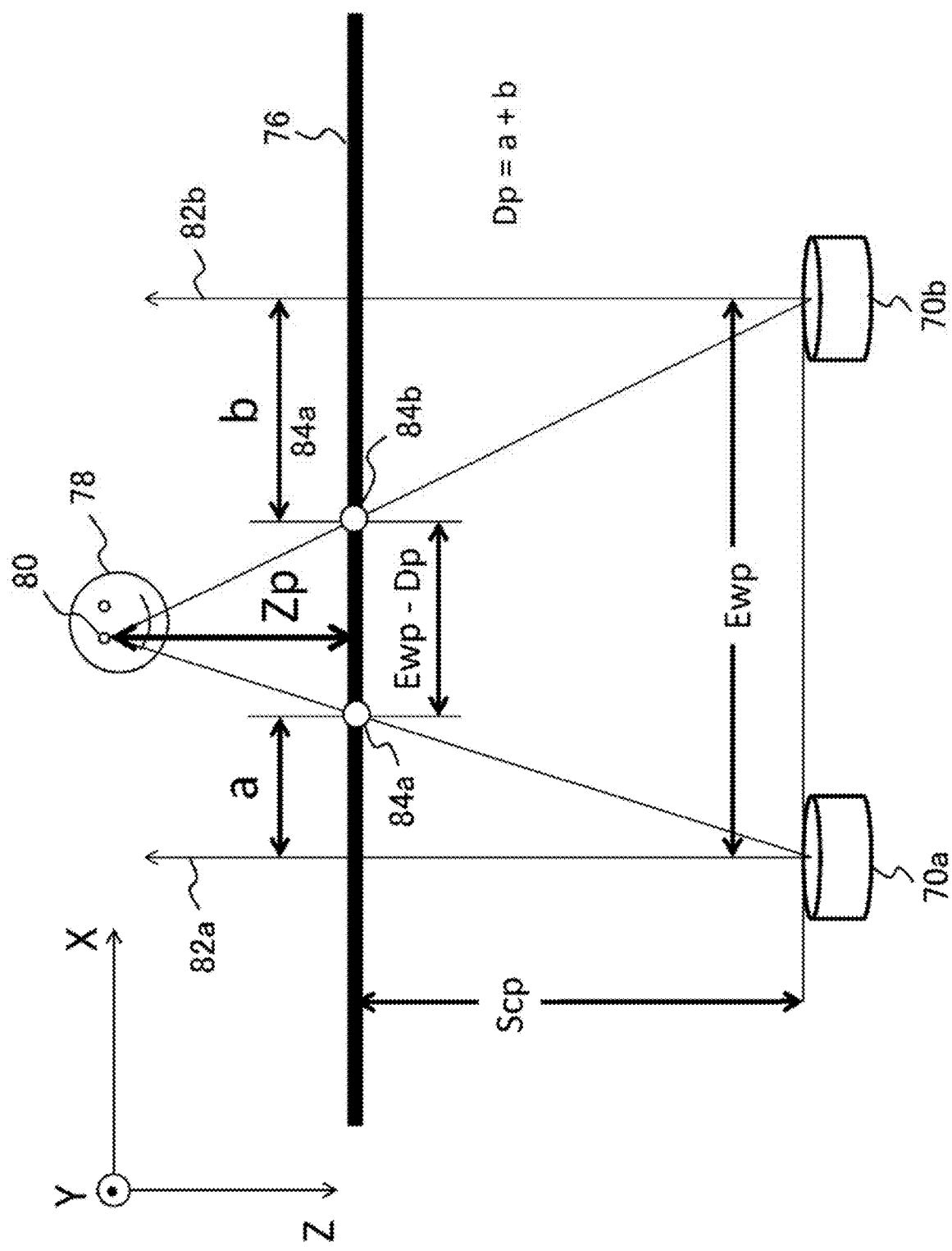
FIG. 5 is a diagram illustrating an image and parallax relationship, the parallax being provided at a stage of acquisition of parallax images according to the present embodiment.

FIG. 5 is a diagram illustrating an image and parallax relationship, the parallax being provided at a stage of parallax image acquisition. FIG. 5 schematically illustrates a bird's eye view of a virtual space including assumed left and right viewpoints (cameras 70a and 70b), an image screen 76 from which parallax images are acquired, and an object 78 contained in the parallax images. Note that the parallax images can be captured by a stereo camera and the cameras 70a and 70b correspond to a stereo camera in that case.

Additionally, in FIG. 5, the planes of a pair of parallax images are simultaneously expressed by the image screen 76. The parallax images originally acquired on the image screen 76 are hereinafter referred to as "original images" and distinguished from a display image provided in a viewing phase. Additionally, hereinafter, a direction perpendicular to the plane of the original images is represented as a Z axis, and a horizontal direction and a vertical direction in the image plane are represented as an X axis and a Y axis.

An image of an object 78 is expressed on the original images. For example, a certain point 80 on the object 78 surface is expressed at a position 84a at a distance a from an optical axis 82a of the left camera 70a toward the right and at a position 84b at a distance b from an optical axis 82b of the right camera 70b toward the left. In other words, a parallax Dp with respect to the point 80 is a+b. In actuality, objects may be present at various positions, and an image of each object is expressed on the left and right original images with a parallax corresponding to a distance in a depth direction.

A distance Zp from the image screen 76 to the point 80 on the object 78 is determined as follows on the basis of similarity of triangles using the parallax Dp.

$$Ewp:Exp-Dp=Scp+Zp:Zp$$

Thus, $$Zp=Scp*Ewp/Dp-Scp$$

where Ewp is a distance between the left and right cameras 70a and 70b, and Scp is a distance from the cameras 70a and 70b to the image screen 76.

Figure 6:
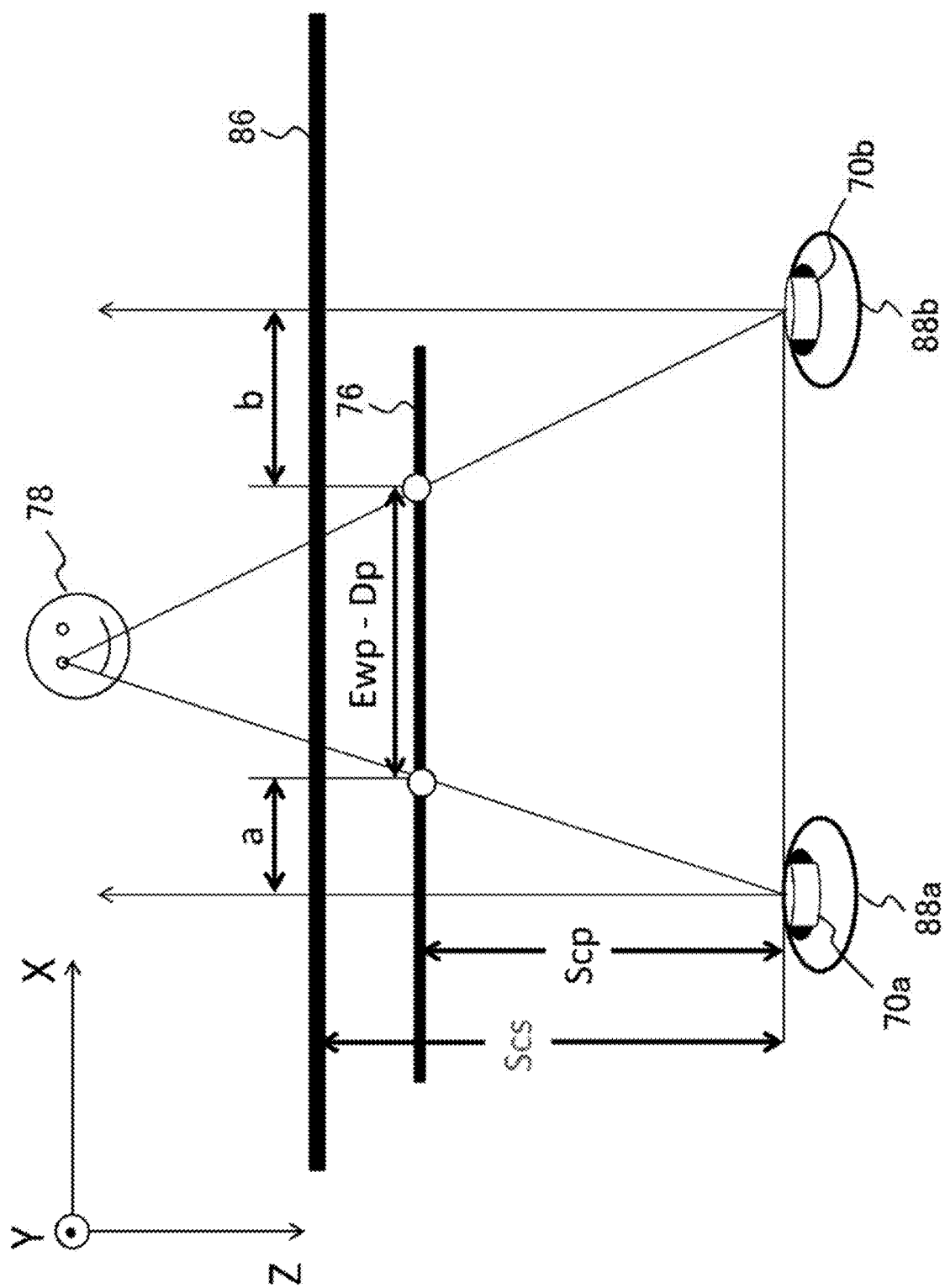
FIG. 6 is a diagram illustrating a viewpoint and image relationship in a case where parallax images are viewed from an appropriate position.

Parallax images thus obtained are assumed to be viewed as described above. FIG. 6 illustrates a viewpoint and image relationship in a case where parallax images are viewed from an appropriate position. FIG. 6 is similar in form to FIG. 5. At a stage of image viewing, viewpoints 88a and 88b of the viewer 54 are present, and a view screen 86 viewed by the viewer is present at a distance Scs from the viewpoints 88a and 88b. In a case where the position relationship observed at the time of acquisition of parallax images illustrated in FIG. 5 is applied to the space as described above, an object 78 can be stereoscopically viewed with no distortion by positioning the image screen 76 such that the viewpoints 88a and 88b of the viewer align with the cameras 70a and 70b as illustrated and projecting, on the view screen 86, parallax images obtained at this position.

This corresponds to viewing frustums of the cameras 70a and 70b obtained at the time of acquisition of the original images respectively coinciding with viewing frustums of the viewpoints 88a and 88b obtained at the time of viewing of the original images. On the other hand, in a case where the viewer moves and the viewpoints 88a and 88b of the viewer deviate from the position relationship as illustrated, the object may appear distorted or fail to be appropriately stereoscopically viewed. In some cases, physical conditions may be affected.

To allow appropriate stereoscopic viewing while permitting movement of the viewpoints, two-dimensional images provided are temporarily back-projected into a three-dimensional virtual space and then projecting the images again on the view screen. For example, one of the left and right original images is divided into micro triangles with a pixel center located at each of the vertexes of the triangle, and the micro triangles are disposed in the virtual three-dimensional space according to the respective distances Zp. The distance Zp is determined from the above-described parallax Dp. The micro triangles are then projected onto the left and right view screens corresponding to the viewpoints of the viewer, and the inside of each micro triangle is drawn by texture mapping.

Figure 7:
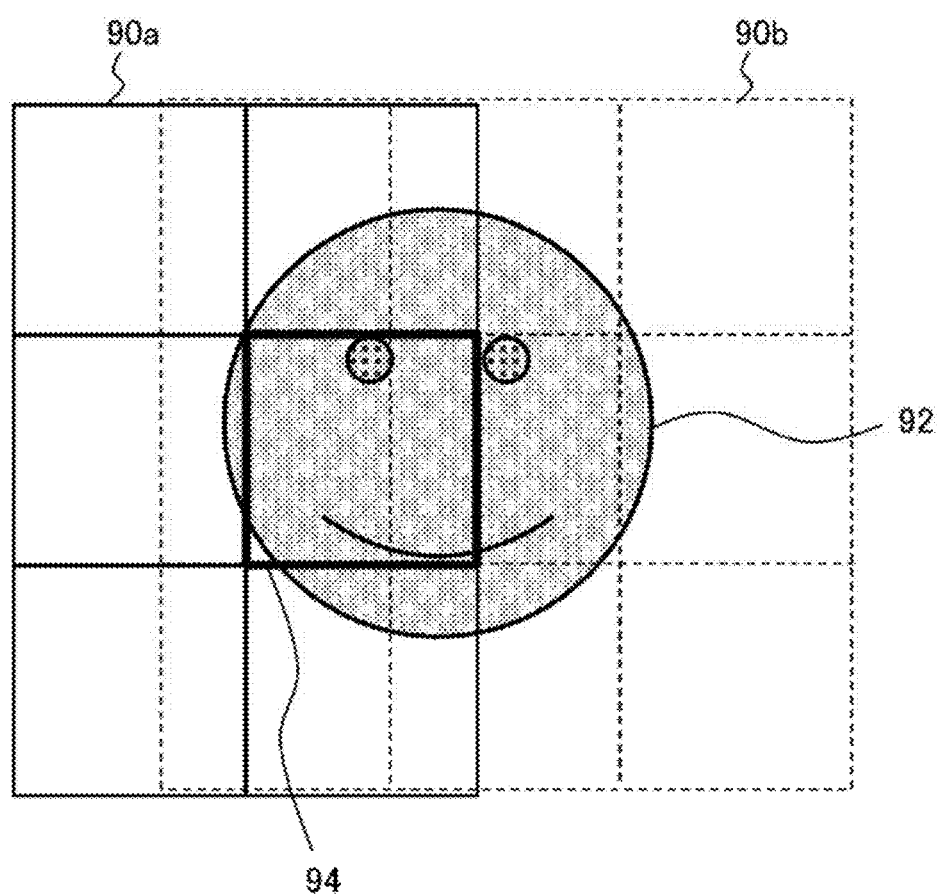
FIG. 7 is a diagram illustrating images of the same object expressed in left and right original images, the images overlapping each other.

However, in this case, a problem described below occurs. FIG. 7 illustrates images of the same object expressed on the left and right original images and overlapping each other. Boundaries of pixel areas in a left-eye original image 90a and a right-eye original image 90b are respectively illustrated by solid lattice cells and dashed lattice cells. As illustrated, even for sets of pixels expressing the same image 92 of an object, the boundaries of pixels in one of the images do not necessarily coincide with the boundaries of pixels in the other image. In this case, for example, an area corresponding to a certain pixel (for example, a pixel 94 framed by thick lines) in the left-eye original image 90a spans two pixels in the right-eye original image 90b.

In this case, a parallax value obtained for the pixel 94 in the left-eye original image 90a is in units of subpixels each smaller than the pixel. In other words, even sets of pixels expressing substantially the same image have a minor difference in the position on the expressed object depending on which of the left and right original images is used as a reference. The difference leads to a difference in parallax value in units of subpixels. As a result, data indicating a parallax value for each pixel often fails to match between the left and right original images. In other words, by generating, for each of the left and right original images, a "parallax value image" holding parallax values in units of pixels, parallax information in units of subpixels and thus depth information can be reflected in the image.

On the other hand, in a case where the original image is divided into micro triangles, which are then disposed in the virtual three-dimensional space, as described above, there is no other choice but to select one of the left and right original images and the depth information is limited to information based on the selected image. As a result, detailed image expression in units of subpixels is difficult. Additionally, specular reflection components or refracted light components of light generally vary between images acquired from different viewpoints, but expressing the object in a sole group of points or a sole set of micro triangles leads to loss of information about these components. As a result, the texture of the object may be affected.

Furthermore, due to the two-stage processing including processing of back-projecting, into the three-dimensional space, micro areas resulting from division and processing of projecting, on the view screen, the micro areas in the three-dimensional space, the quality of the final display image is likely to be degraded. Even in a case where the viewpoints of the viewer are at the appropriate positions as illustrated in FIG. 6 and the image need originally not be converted, the intervention of the processing as described above uselessly degrades the image quality.

Additionally, in known processing, for example, even in a case where a large amount of memory is prepared and information related to back projection in the three-dimensional virtual space is saved to the memory as a group of points or a set of micro triangles, each point needs to be perspective-transformed for the view screen, leading to a heavy processing load. Accordingly, particularly in a case where the original images are moving images or the viewer moves fast, an unignorable latency occurs. Thus, in the present embodiment, the original images are associated directly with the display image to minimize degradation of the image quality and latency. Specifically, how an image in the original images moves according to a variation in the view screen according to movement of the viewpoints is calculated for each pixel on the view screen, and the display image is drawn.

In the calculation, a corrected image is generated on the same plane as the original images or on a plane parallel to the original images, and the corrected image is obtained by correcting the original images so as to prevent, even with movement of the viewpoints, a corresponding change in the position of the object or corresponding distortion of the object in the virtual space. This simplifies perspective transformation processing using a 4×4 perspective transformation matrix for each point, enabling displacement of each pixel to be calculated with a small amount of calculation. Additionally, finally, the corrected image needs to be perspective-transformed for the view screen, but it is sufficient that the transformation needs to be performed on one triangle covering the entire corrected image, enabling very efficient processing using known graphics hardware. Note that, in the following description, the positions of the viewpoints with the viewing frustum of the camera coinciding with the viewing frustum of the viewer are used as base points as illustrated in FIG. 6 and that movement of the viewpoints from the base points and corresponding changes in the image are focused on.

Figure 8:
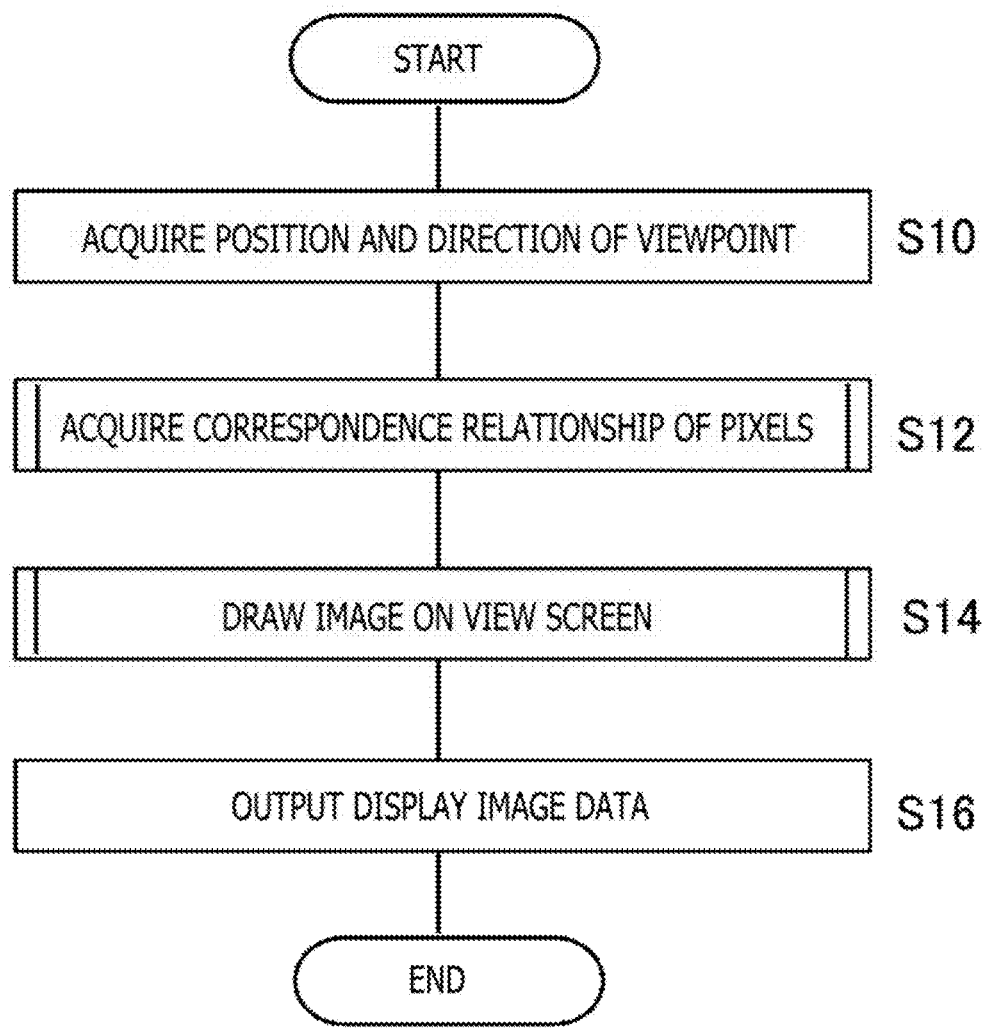
FIG. 8 is a flowchart schematically illustrating a processing procedure in which the image generating apparatus according to the present embodiment generates a display image from original images.

FIG. 8 is a flowchart schematically illustrating a processing procedure in which the image generating apparatus 200 according to the present embodiment generates a display image from the original images. The image generating apparatus 200 first acquires the positions of the viewpoints of the viewer and the direction of the line of sight of the viewer (S10). For example, the posture of the head of the viewer can be acquired using the motion sensor built in the head-mounted display 100. Additionally, an image of the viewer can be captured using an imaging apparatus not illustrated, and the position and posture of the head of the viewer can be acquired on the basis of, for example, an image of a light emitting marker provided on the surface of the head-mounted display 100.

Alternatively, an imaging apparatus not illustrated and capturing an image corresponding to the visual field of the viewer may be provided on the head-mounted display 100 side to acquire the position and posture of the head on the basis of a technique such as simultaneous localization and mapping (SLAM). In a case where the position and posture of the head can be acquired as described above, the positions of the viewpoints of the viewer and the direction of line of sight of the viewer can be approximately determined. Those who skilled in the art appreciate that the method for acquiring the viewpoints and line of sight of the viewer is not limited to the utilization of the head-mounted display 100 but that various other methods are possible.

Then, the image generating apparatus 200 sets the view screen such that the view screen corresponds to the positions of the viewpoints and the direction of line of sight, and calculates which of the positions on the original images corresponds to the pixel on the view screen (S12). More specifically, first, a corrected image is generated by determining the moving distance and direction of each of the pixels constituting the image, and changing the original images such that the object expressed in the images are prevented from changing according to movement of the viewpoints, that is, such that the position of the object appears fixed in the virtual screen. At this time, the plane (image screen) on which the corrected image is generated may be located at the same position as that of the original images or may be translated in the Z-axis direction according to movement of the viewpoints.

Furthermore, the entire corrected image is perspective-transformed according to the direction of line of sight. Qualitatively, reversely tracking the sequence of motions as described above determines, for each pixel on the view screen, the corresponding position on the original images. Then, the color value of the position in the original images is reflected in the pixel on the view screen to draw the display image (S14). These processing steps are executed on the left and right viewpoints to allow generation of parallax images to be displayed. A lens distortion correction is appropriately applied to the data of the parallax images, and the corrected data is output to the head-mounted display 100 (S16). Then, a stereoscopic image with no distortion can caused to be viewed with a visual field corresponding to movement of the viewpoints without intervention of back projection into the virtual three-dimensional space.

The processing in the two stages S12 and S14 in FIG. 8 can also be implemented by sequentially changing the original images themselves. That is, the viewpoints are moved to temporarily change the original images to generate a corrected image, which is then perspective-transformed on the view screen. Thus, the display image can be drawn. However, in this case, the conversion processing is executed twice on the original images, and thus the quality of the display image may be prevented from being maintained. Thus, instead of generating the above-described second original images, an image map is generated that indicates which position on the original images each pixel in the corrected image corresponding to viewpoint movement has originally been located at.

Then, the image map is projected on the view screen to determine the position relationship between the view screen and the map. Which position on the original images the pixel on the view screen corresponds is checked, and the color value is acquired from the original images. This processing requires only one manipulation on the original images, allowing the image quality at an original image level. Here, information indicating which position on the original images each pixel in the corrected image corresponds to is vector values specifying a start point and an end point on the image plane. Thus, information is hereinafter referred to as an "image reference vector." Additionally, a map corresponding to the image plane and holding information of a movement reference vector for each pixel on the corrected image is referred to as an "image reference vector map" or simply a "map."

Figure 9:
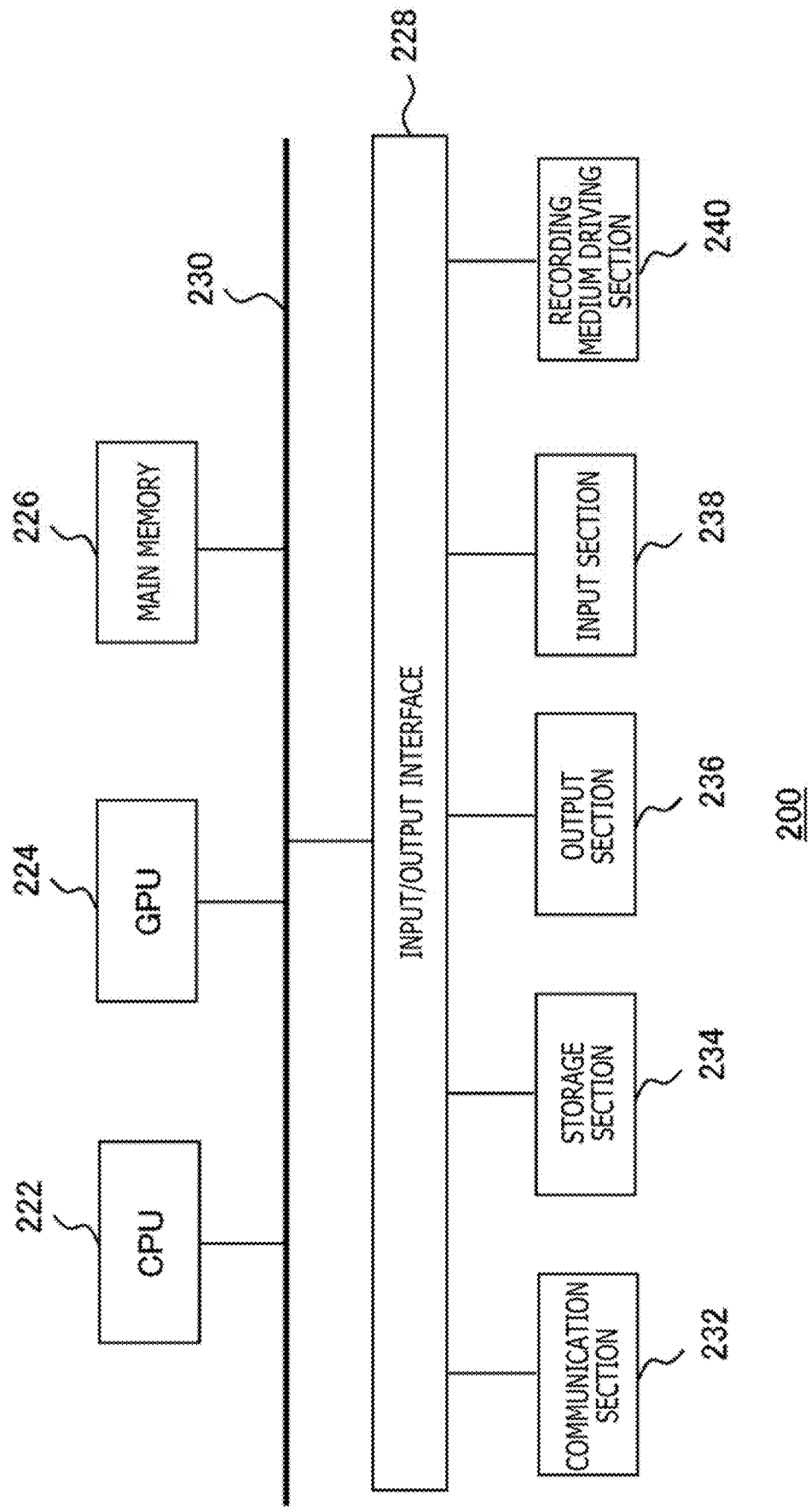
FIG. 9 is a diagram illustrating an internal circuit configuration of the image generating apparatus according to the present embodiment.

FIG. 9 illustrates an internal circuit configuration of the image generating apparatus 200. The image generating apparatus 200 includes a central processing unit (CPU) 222, a graphics processing unit (GPU) 224, and a main memory 226. These sections are connected together via a bus 230. An input/output interface 228 is connected to the bus 230.

The input/output interface 228 connects to a peripheral equipment interface such as a USB or an Institute of Electrical and Electronics Engineers (IEEE) 1394, a communication section 232 including a network interface for a wired or wireless local area network (LAN), a storage section 234 such as a hard disk drive or a non-volatile memory, an output section 236 outputting data to a display apparatus such as the head-mounted display 100, an input section 238 receiving data from the head-mounted display 100, and a recording medium driving section 240 driving a removable recording medium such as a magnetic disk, an optical disc, or a semiconductor memory.

The CPU 222 executes an operating system stored in the storage section 234 to control the whole image generating apparatus 200. The CPU 222 also executes various programs read from the removable recording medium and loaded into the main memory 226 or downloaded via the communication section 232. The GPU 224 includes the function of a geometry engine and the function of a rendering processor, executes drawing processing in accordance with a drawing instruction from the CPU 222, and stores the display image in a frame buffer not illustrated. The GPU 224 then converts, into a video signal, the display image stored in the frame buffer, and outputs the video signal to the output section 236. The main memory 226 includes a random access memory (RAM) to store programs and data needed for processing.

Figure 10:
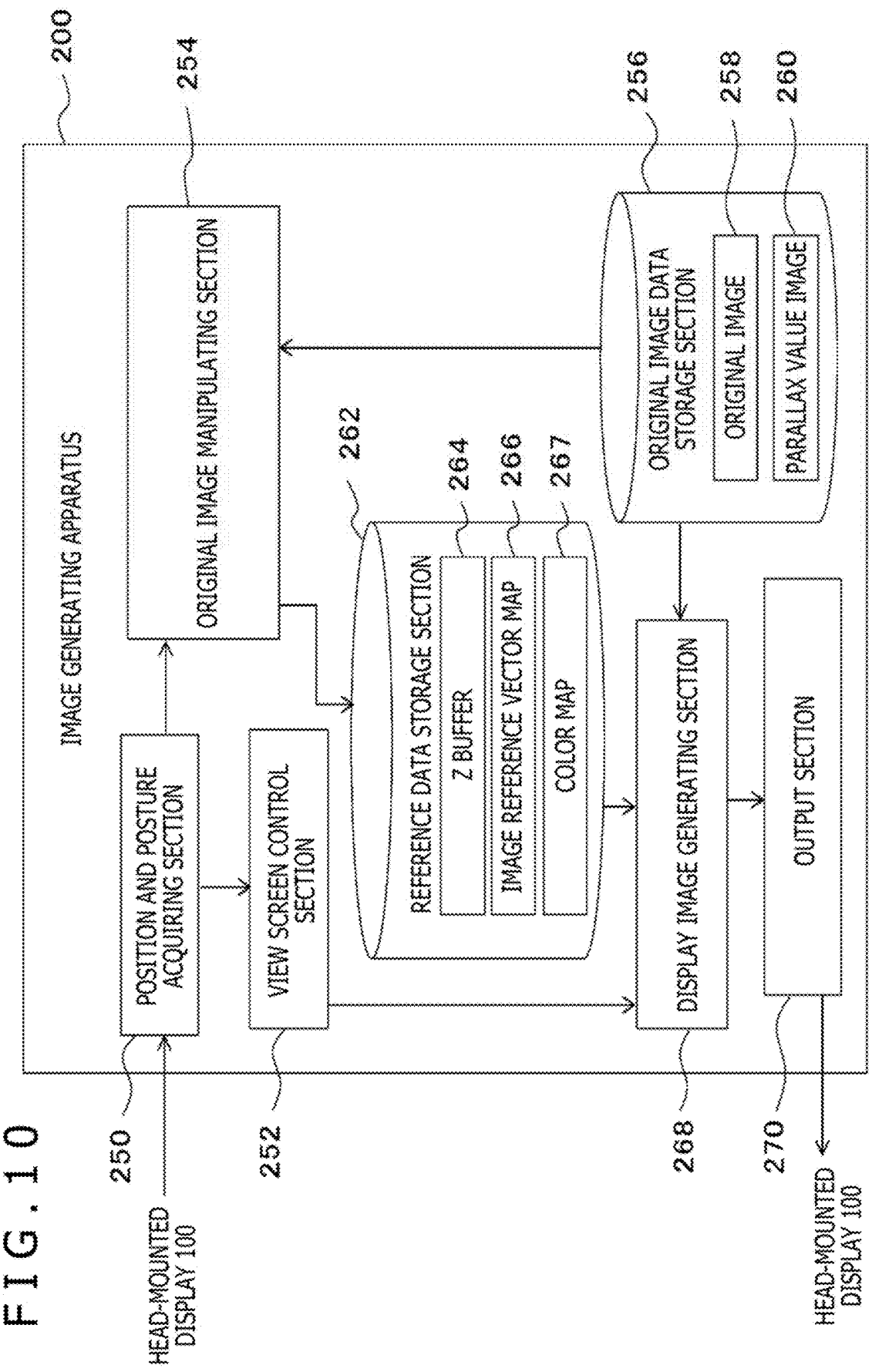
FIG. 10 is a diagram illustrating functional blocks of the image generating apparatus according to the present embodiment.

FIG. 10 illustrates a functional block diagram of the image generating apparatus 200 according to the present embodiment. Note that at least some of the functions of the image generating apparatus 200 illustrated in FIG. 10 may be implemented in the head-mounted display 100. Alternatively, at least some of the functions of the image generating apparatus 200 may be implemented in a server connected to the image generating apparatus 200 via a network. Additionally, the image generating apparatus 200 may be a part of an information processing apparatus such as a game machine or a personal computer.

FIG. 10 illustrates a block diagram focusing mainly on those of the functions of the image generating apparatus 200 which generate a display image. The functional blocks can be implemented, in terms of hardware, by components such as the CPU, GPU, and various memories illustrated in FIG. 9, and in terms of software, by programs loaded from the recording medium or the like into the memory and providing various functions such as a data input function, a data holding function, an image processing function, and a communication function. Thus, those who skilled in the art appreciate that the functional blocks can be implemented in various manners, for example, only by hardware, only by software, and by a combination of hardware and software, and the implementation is not limited to any one of the manners.

The image generating apparatus 200 includes a position and posture acquiring section 250 acquiring the position and posture of the head-mounted display 100, a view screen control section 252 controlling the view screen on the basis of the positions of the viewpoints or the direction of the line of sight, the original image manipulating section 254 generating an image reference vector map on the basis of the positions of the viewpoints, an original image data storage section 256 storing the data of the original images, a reference data storage section 262 storing intermediate data such as the image reference vector map, a display image generating section 268 using the image reference vector map to draw the display image on the view screen, and an output section 270 outputting the data of the generated display image.

The position and posture acquiring section 250 uses any of the above-described means to acquire the position and posture of the head of the viewer. The view screen control section 252 determines the positions of the viewpoints and the direction of line of sight of the viewer on the basis of the position and posture of the head acquired by the position and posture acquiring section 250. The display image drawn on the view screen includes, for example, the left-eye image 60*a* and the right-eye image 60*b* illustrated in FIG. 4, and the view screen is also set for each of the left eye and the right eye.

The original image manipulating section 254 calculates the moving distance and direction of each of the pixels constituting the image of the object according to the positions of the viewpoints. The original image manipulating section 254 generates an image reference vector indicating which of the positions in the original images each of the pixels on the screen corresponds to. The original image manipulating section 254 further generates an image reference vector map for each of the left and right eyes in which the vector is associated with each pixel on the image plane on the screen.

As described below, determining an image reference vector needs the distance Zp, in the virtual space, to the object expressed on the image, in addition to the moving distances and moving directions of the viewpoints. The distance Zp is determined from the parallax Dp between the left and right original images as described above. The original image data storage section 256 stores left and right original image data 258 and left and right parallax value image data 260 holding parallax values for the respective pixels in each image. Separate parallax value images are prepared for the left and right eyes in order to utilize information of subpixel accuracy as described above. Note that, instead of the parallax value image data 260, distance value image data holding the distance Zp for each of the pixels in the left and right images may be prepared.

Depending on the viewpoints, the original image manipulating section 254 may provide, for the image reference vector map for the left eye, pixels referencing the right-eye original image, and for the image reference vector map for the right eye, pixels referencing the left-eye original image. This is because a portion of one of the left and right original images which corresponds to a blind spot and which is not expressed as an image may be expressed in the other original image. In a case where movement of the viewpoints leads to a need to display such a blind spot portion, acquiring data from the other image allows such details to be accurately reproduced. The original image manipulating section 254 may further extend the parallax value of the parallax value image to the outside of the image to prepare an image reference vector for the extension. This will be described below in detail.

In a case where the recursive filter described below is introduced, the original image manipulating section 254 further generates a color map in which color values determined in the past are expressed on the same image plane as that for the image reference vector maps. Color values for the current frame acquired from the original images using image reference vectors are synthesized with color values acquired from the color map and determined in the preceding frame for pixels expressing the surface of the same object, to obtain color values for the pixels in the current frame. Thus, filtering is applied in a time direction to suppress possible flickers near the contour of the object.

A map of color values for the current frame determined as described above is used to determine color values for the next frame as a new color map. Under particular conditions, the original image manipulating section 254 also moves the image reference vector maps in the X-axis direction and in the Y-axis direction according to the amounts of displacements of an X component and a Y component of each viewpoint of the viewer. This allows original high-quality images to be stereoscopically viewed in as good conditions as possible in spite of a tilt of the head of the viewer or postural imbalance of the viewer.

The reference data storage section 262 includes a storage area for a Z buffer 264 storing left and right image reference vector maps 266 generated by the original image manipulating section 254 and also storing Z value information for determining whether to write an image reference vector at a stage of creating the image reference vector map. The reference data storage section 262 also stores a color map 267 described above. The display image generating section 268 references the pixel value in the original image data 258 or the color map 267 corresponding to each pixel on the view screen set by the view screen control section 252 to determine the color values, and draws the display image. That is, the image reference vector maps are mapped onto the view screen by perspective transformation, and the original images are referenced on the basis of image reference vectors acquired at positions on the maps corresponding to pixels on the view screen, to determine the color values for the pixels.

Alternatively, for a pixel satisfying a predetermined condition such as the neighborhood of the contour of the object, the color map 267 is referenced instead of an image reference vector to determine a pixel value on the view screen. This is performed on each of the left and right eyes to allow generation of display images for the right eye and the left eye. Note that the original image data 258 stored in the original image data storage section 256 may be data of a plurality of resolutions and that the resolution used for drawing may be switched according to the degree of a reduction ratio based on perspective transformation.

A method for switching the resolution of the original images and performing texture mapping to suppress flickers in the image is known as MIP mapping. However, in the present embodiment, on the basis of, instead of a reduction ratio for micro areas into which the image is divided, the moving distances of the viewpoints over which the pixels on the screen transition from the primary, original images, a level of detail (LOD) is calculated, and the appropriate resolution is selected. Accordingly, regardless of however the micro areas of the original images are deformed by perspective transformation, the appropriate resolution for the pixels can be independently determined.

The output section 270 outputs the data of the left and right display images generated by the display image generating section 268, at a predetermined rate to the head-mounted display 100. At this time, a lens distortion correction may be applied to the display images before output. The output section 270 may further output acoustic data such as music for menu screens and sounds included in various contents.

Figure 11:
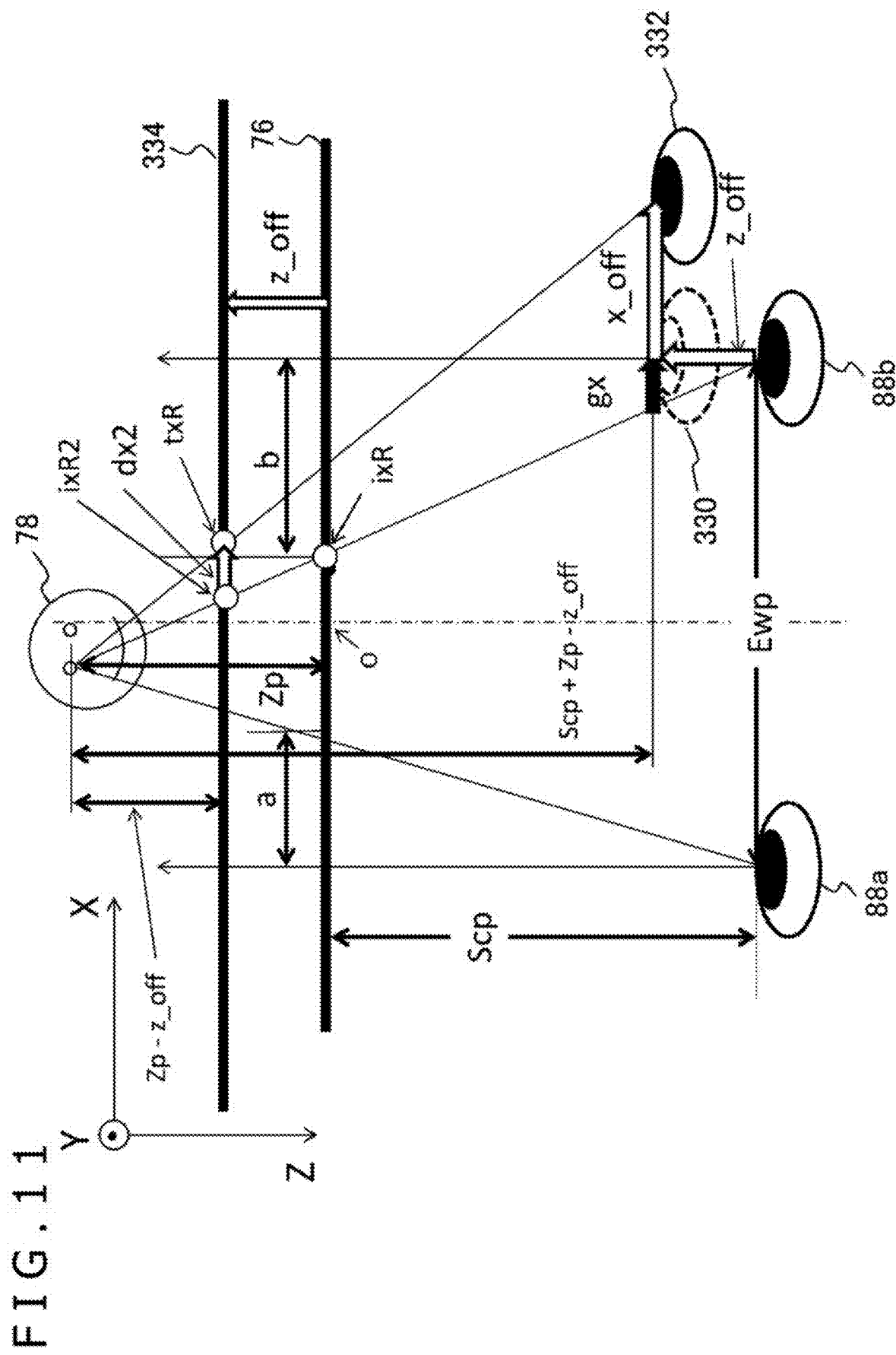
FIG. 11 is a diagram illustrating a relationship between moving distance components in a Z-axis direction and an X-axis direction included in the moving distance of a viewpoint and the corresponding moving distances of pixels in original images according to the present embodiment.

Now, a method will be described in which the original image manipulating section 254 calculates an image reference vector. FIG. 11 is a diagram illustrating a relationship between moving distance components in the Z-axis direction and the X-axis direction included in the moving distance of the viewpoint and the corresponding moving distances of pixels in original images. FIG. 11 illustrates the viewpoints resulting from moving, by −z_off in the Z-axis direction and x_off in the X-axis direction, of the viewpoints 88*a* and 88*b* in the state illustrated in FIG. 6, and a right-eye viewpoint 332 represents the viewpoints.

The image screen 76 is moved by −z_off according to the movement in the Z-axis direction, and an image reference vector is generated for each of the pixels on the plane. However, for example, in a case where the moving distance of the viewpoint in the Z-axis direction is relatively short, the image screen 76 need not be moved. The moved image screen is hereinafter referred to as the "map screen" 334. The image reference vector is information indicating a correspondence relationship for the pixels when the object 78 in the virtual space appears fixed when the original image is viewed from the viewpoint 88b and when the map screen 334 is viewed from the viewpoint 332 resulting from movement. For example, an image visible at a position ixR in the X-axis direction of the right-eye original image as viewed from the viewpoint 88b is moved to a position txR on the map screen 334 and then viewed from the viewpoint 332. The object 78 appears fixed.

Note that an intersection point between the image screen 76 and a line of the Z-axis direction passing through the midpoint of a segment joining the viewpoints 88a and 88b, which act as base points, is designated as an origin O of the image regardless of whether the image is for the right eye or for the left eye. First, movement of the viewpoint 88b in the Z-axis direction is taken out for consideration. At this time, the original viewpoint 88b and the image screen 76 are translated in a Z-axis negative direction by z_off with the relationship between the original viewpoint 88b and the image screen 76 maintained. The moved viewpoint 330 and map screen 334 are obtained. On the other hand, the object 78 is fixed, and thus movement of the viewpoint in the Z-axis direction substantially corresponds to movement, in the X-axis direction, of the line of sight for viewing the object 78. The moving distance at this time is represented as gx.

On the basis of similarity of triangles, the following is satisfied.

$$b:gx=Scp:z\_off$$

Thus, the moving distance gx is determined as follows.

$$gx=b*z\_off/Scp$$

On the other hand, a position ixR2 on the map screen 334 corresponding to the position ixR on the image screen 76 and resulting from movement of the screen by z_off is determined as follows.

$$ixR-ixR2:z\_off=b:Scp$$

Thus, the following is satisfied.

$$ixR2=ixR-b*z\_off/Scp=ixR-gx$$

For the above-described gx, the movement x_off in the X-axis direction to the final viewpoint 332 is further taken into account. Then, a moving distance dx2 from the position ixR2 on the map screen 334 is determined as follows.

$$dx2:x\_off+gx=Zp-z\_off:Scp+Zp-z\_off$$

Accordingly, the following is satisfied.

$$dx2=(x\_off+gx)*(Zp-z\_off)/(Scp+Zp-z\_off)$$

A position txR on the map screen 334 corresponding to the position ixR on the image screen 76 and resulting from movement of the viewpoint z_off and x_off is expressed using the above-described dx2 as follows.

$$txR=ixR2+dx2=ixR-gx+dx2$$

That is, a difference between txR and ixR depends on the position of the image of the object in the original image, the parallax value (or the distance to the image screen) for the object provided in the original image, and the moving distance of the viewpoint.

For movement of the left eye viewpoint, similar calculations can be executed as follows.

$$gx=a*z\_off/Scp$$

$$ixL2=ixL+gx$$

$$dx2=(x\_off-gx)*(Zp-z\_off)/(Scp+Zp-z\_off)$$

$$txL=ixL2+dx2=ixL+gx+dx2$$

Here, ixL, ixL2, and txL denote a horizontal direction position in the left-eye original image on the image screen 76, a corresponding position resulting from movement of the image screen by z_off, and a position on the map screen 334 for preventing the object 78 from being changed even with movement of the left viewpoint by z_off and x_off.

Figure 12:
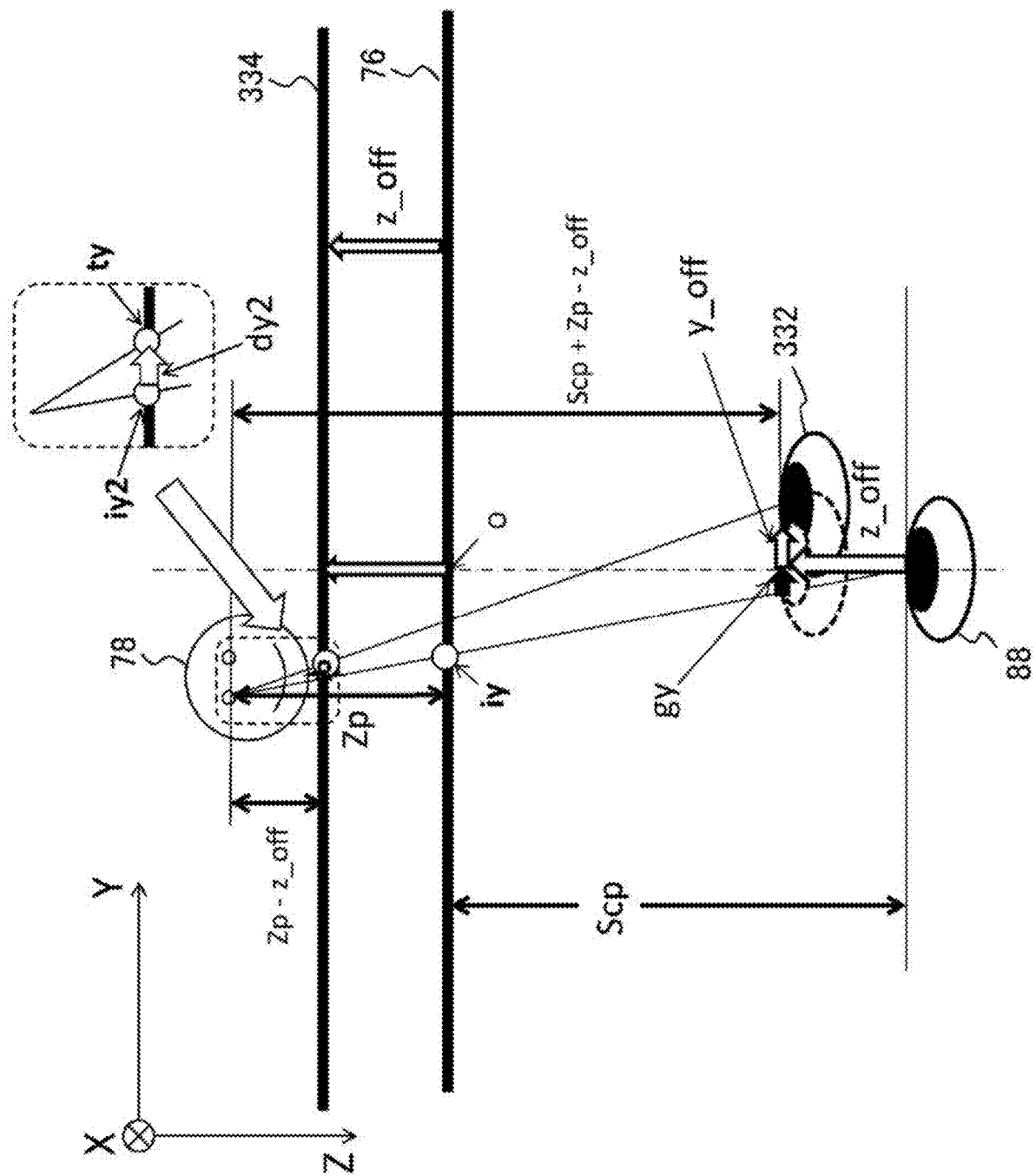
FIG. 12 is a diagram illustrating a relationship between moving distance components in the Z-axis direction and the Y-axis direction included in the moving distance of the viewpoint and the corresponding moving distances of the pixels in the original images according to the present embodiment.

FIG. 12 is a diagram illustrating the relationship between the moving distance components in the Z-axis direction and the X-axis direction included in the moving distance of the viewpoint and the corresponding moving distances of pixels in original image. FIG. 12 differs from FIG. 11 in the directions of the coordinate axes, and the horizontal axis in FIG. 12 is the Y axis. In other words, in this state, the virtual space is viewed from a lateral direction, and the viewpoints 88 for both eyes overlap. The calculation method is basically similar to that described with reference to FIG. 11. That is, an image visible at a position iy in the Y-axis direction in the original image on the image screen 76 is moved to a position ty on the map screen 334 such that the object 78 appears fixed.

In FIG. 12, a figure of the neighborhood of ty is separately enlarged. First, the moving distance gy of the line of sight in the Y-axis direction resulting from movement of the viewpoint 88 by −z_off in the Z-axis direction is determined as follows.

$$gy=-iy*z\_off/Scp$$

In this case, a negative sign is provided because, in the illustrated example, iy is located in a negative area below the origin O. On the other hand, a position iy2 on the map screen 334 corresponding to the position iy on the image screen 76 and resulting from movement of the screen by z_off is determined as follows.

$$iy2=iy-iy*z\_off/Scp=iy+gy$$

This calculation includes a division. However, Scp is a constant, and thus only one division is needed for the entire processing.

For the above-described gy, the movement y_off in the Y-axis direction to the final viewpoint 332 is further taken into account. Then, a moving distance dy2 from the position iy2 on the map screen 334 is determined as follows.

$$dy2=(y\_off+gy)*(Zp-z\_off)/(Scp+Zp-z\_off)$$

A position ty on the map screen 334 corresponding to the iy on the image screen 76 and resulting from movement of the viewpoints z_off and y_off is expressed using the above-described dy2 as follows.

$$ty=iy2+dy2=iy+gy+dy2$$

This calculation is the same for both the left and right images. Note that the division by (Scp+Zp−z_off) in the calculation of dy2 corresponds to a perspective division in general perspective transformation processing.

In this manner, a small amount of calculation can be used to derive the correspondence relationship between the position (tx, ty) on the image reference vector map and the position (ix, iy) on the original image, corresponding to each component (x_off, y_off, z_off) of the moving distance of the viewpoint. Note that the positions txR and txL in the X-axis direction in the left and right images are collectively referred to as tx and that the positions ixR and ixL in the X-axis direction in the left and right images are collectively referred to as ix.

Now, a method for calculating image reference vectors in a case where in one of the image reference vector maps, the other original image is referenced will be described. As described above, the left and right original images may include a portion that corresponds to a blind spot at the time of acquisition and that is not expressed as an image but that becomes visible as a result of movement of the viewpoint. The original image manipulating section 254 generates, for a pixel to express such an image, an image reference vector referencing the other original image to allow the portion corresponding to the former blind spot to be more accurately drawn. Such a technique is referred to as cross reference of parallax images.

Figure 13:
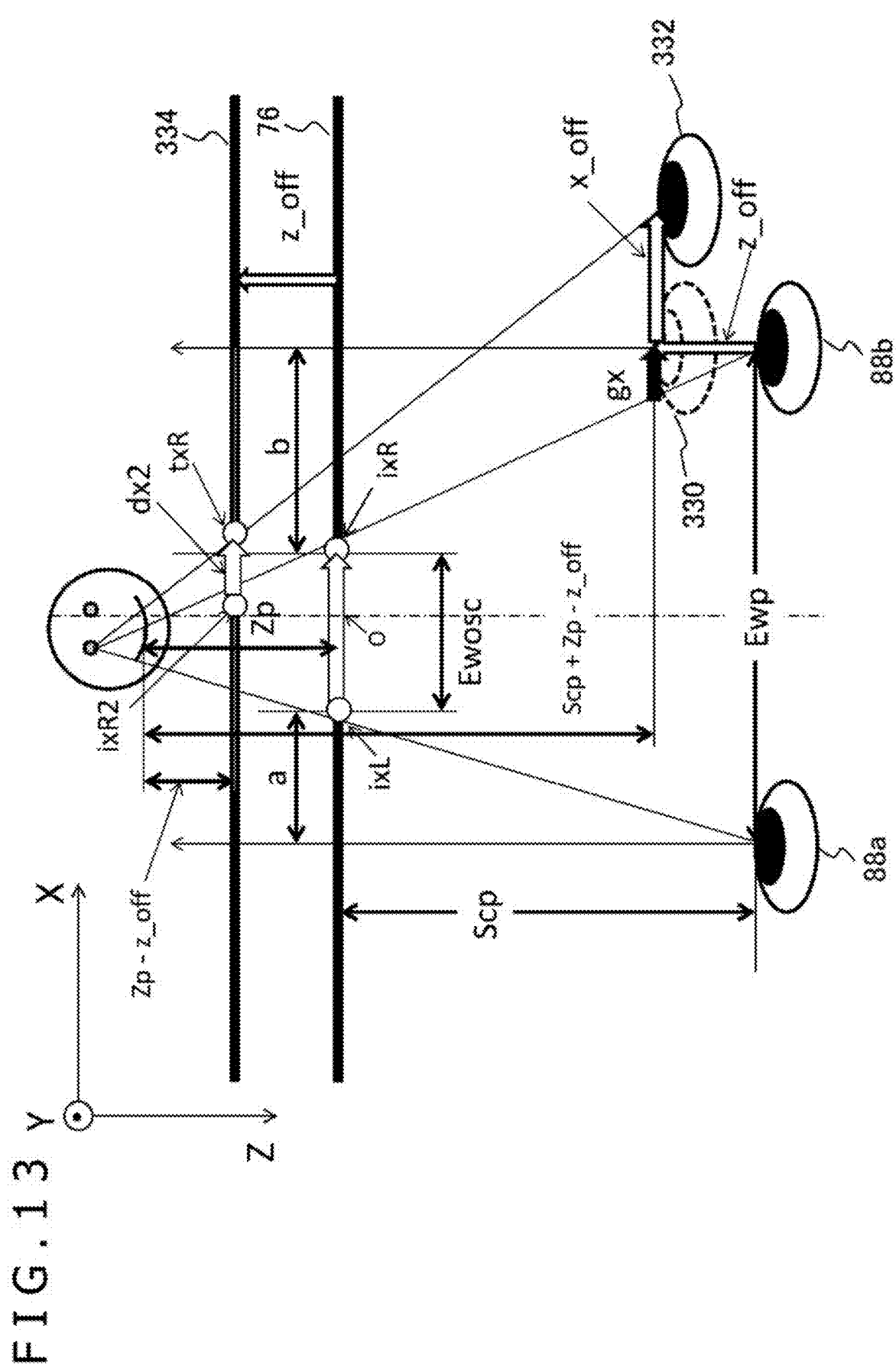
FIG. 13 is a diagram illustrating a relationship between moving distance components in the Z-axis direction and the X-axis direction included in the moving distance of the viewpoint and the moving distance of each of the pixels in a case where the original image for the left eye is referenced in an image reference vector map for the right eye according to the present embodiment.

FIG. 13 is a diagram illustrating a relationship between the moving distance components in the Z-axis direction and the X-axis direction included in the moving distance of the viewpoint and the moving distance of each of the pixels in a case where the original image for the left eye is referenced in the image reference vector map for the right eye. The concept of the calculation is similar to that illustrated in FIG. 11 except that the position ixL in the left-eye image, corresponding to the original start point ixR, is used as a start point.

That is, as is the case with FIG. 11, movement of the right-eye viewpoint is focused on. Then, as described above, the position txR on the map screen 334 corresponding to the position ixR on the image screen 76 and resulting from movement of the viewpoint by z-off and x_off is as follows.

$$txR=ixR2+dx2=ixR-gx+dx2$$

The position ixR in the right-eye original image and the corresponding position ixL in the left-eye original image have the following relationship.

$$ixR=ixL+Ewosc$$

Here, Ewosc is determined as follows from a distance Ewp between the viewpoints 88a and 88b and the parallax in the original image Dp=a+b.

$$Ewosc=Ewp-Dp$$

As a result, in a case where the position ixL in the left-eye original image is used as a start point, txR is determined as follows.

$$txR=ixL+Ewosc-gx+dx2$$

The parallax Dp used to calculate Ewosc is a value held by a left-eye parallax value image and applied to the pixels in the left-eye original image. For movement of the left eye viewpoint, similar calculation can be executed. That is, the position txL on the map screen 334 corresponding to the position ixL on the image screen 76 is expressed as follows.

$$txL=ixL2+dx2=ixL+gx+dx2$$

Thus, in a case where the position ixR on the right-eye original image is used as a start point, the following is satisfied.

$$txL=ixR-Ewosc+gx+dx2$$

However, the parallax Dp used to calculate Ewosc is a value held by the right-eye parallax value image and applied to the pixels in the right-eye original image. As in the case where cross reference is not performed, movement of the position in the Y-axis direction resulting from movement of the viewpoint is as follows.

$$ty=iy2+dy2=iy+gy+dy2$$

The above-described calculation allows an image reference vector to be set for each of the pixels in the image reference vector map as in the case where cross reference is not performed.

The above-described method is cross reference for the left and right original images. However, by acquiring separate original images with viewpoints located further outside the left and right cameras used to acquire original images, pixels having failed to be compensated for by cross reference with the primary, original images can be compensated for. Here, a method using, as reference destinations, original images acquired from the outside viewpoints is referred to as extended reference.

Figure 14:
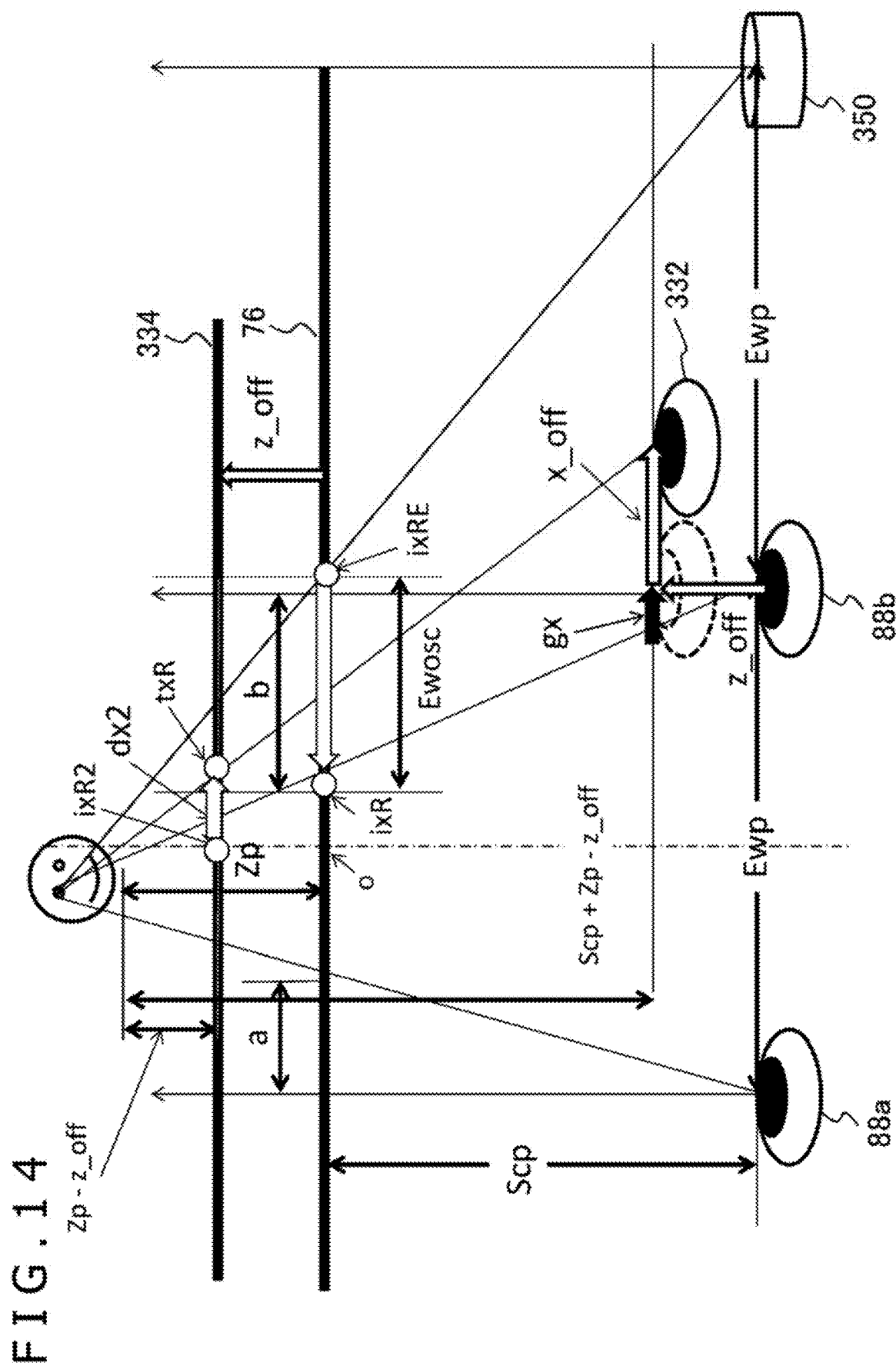
FIG. 14 is a diagram illustrating a method for calculating image reference vectors in extended reference according to the present embodiment.

FIG. 14 is a diagram illustrating a method for calculating image reference vectors in extended reference. In this example, a camera 350 is set further on the right side of and at a distance Ewp from the right viewpoint 88b, included in the viewpoints 88a and 88b assumed for acquisition of the primary left and right original images, and a third original image is acquired. In a case where movement of the viewpoint leads to a need to draw a portion that is a blind spot for the viewpoint 88b and that is not expressed in the right-eye original image, an image reference vector is set to reference the third original image. The concept of the calculation is similar to that in the case of cross reference illustrated in FIG. 13 except that, instead of the position ixL in the left-eye image, a corresponding position ixRE on the third original image is used as a start point.

That is, as is the case with FIG. 11, movement of the right-eye viewpoint is focused on. Then, as described above, the position txR on the map screen 334 corresponding to the position ixR on the image screen 76 and resulting from movement of the viewpoint by z-off and x_off is as follows.

$$txR=ixR2+dx2=ixR-gx+dx2$$

The position ixR in the right-eye original image and the corresponding position ixRE in the third original image have the following relationship.

$$ixR=ixRE-Ewosc$$

Here, Ewosc is determined as follows from the distance Ewp between the viewpoints and a parallax Dp in a parallax value image generated in association with the third original image, the parallax corresponding to the pixel at the position ixRE.

$$Ewosc=Ewp-Dp$$

As a result, in a case where the position ixRE on the third original image is used as a start point, txR is determined as follows.

$$txR=ixRE-Ewosc-gx+dx2$$

Similar calculation can be executed in a case where a camera installed further on the left side of the left viewpoint 88a is used to acquire a fourth original image, which is referenced for drawing the left-eye display image. That is, the position txL on the map screen 334 corresponding to the position ixL on the image screen 76 is as follows.

$$txL=ixL2+dx2=ixL+gx+dx2$$

Thus, in a case where the position ixLE on the fourth original image is used as a start point, the following is satisfied.

$$txL=ixLE+Ewosc+gx+dx2$$

As in the case where cross reference is not performed, movement of a position in the Y-axis direction caused by movement of the viewpoint is as follows.

$$ty=iy2+dy2=iy+gy+dy2$$

The above-described calculation allows an image reference vector to be set for each of the pixels in the image reference vector map.

Note that the example has been described in which the cameras are set further on the right side of the right viewpoint 88b and further on the left side of the left viewpoint 88a at the distance Ewp from the right viewpoint 88b and the left viewpoint 88a. However, in a case where this structure is extended to multiply the distance by n, that is, n*Ewp, txR and txL are determined as follows.

$$txR=ixRE-Ewosc*n-gx+dx2$$

$$txL=ixLE+Ewosc*n+gx+dx2$$

Figure 15:
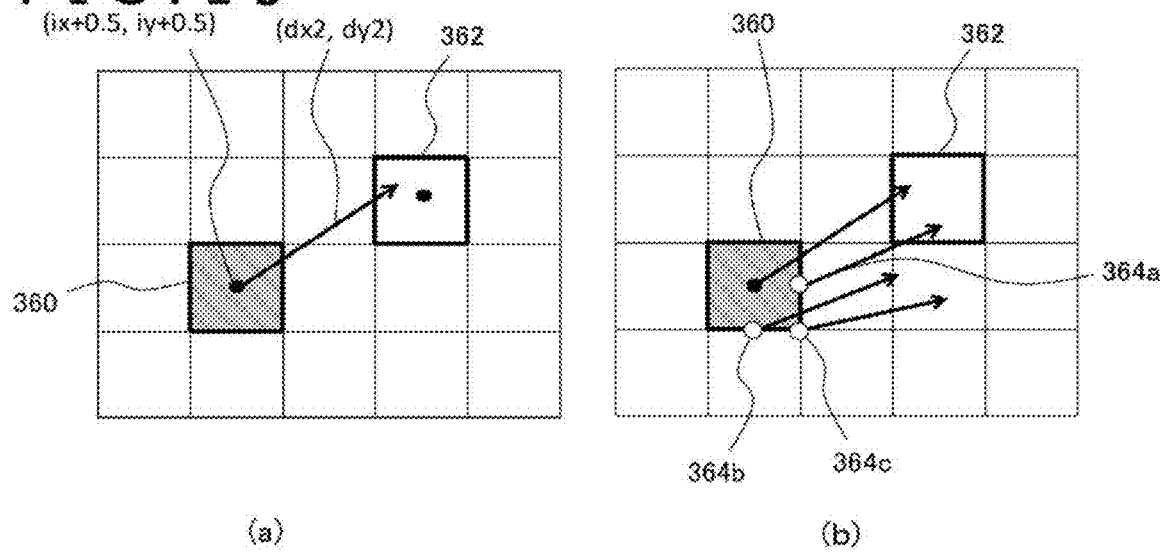
FIG. 15 is a diagram schematically illustrating a relationship between displacement vectors and pixel areas according to the present embodiment.

Incidentally, the image reference vector is a vector tracking, in the opposite direction, displacement (hereinafter, referred to as "displacement vector") from the position (ix, iy) on the original image to the position (tx, ty) on the image reference vector map, corresponding to movement of the viewpoint, as described above. However, for determination of an image reference vector, pixel areas on the image plane needs to be taken into account. FIG. 15 schematically illustrates a relationship between displacement vectors and pixel areas. Cells illustrated in FIG. 15 represent pixel areas in the original image and the image reference vector map. Here, it is assumed that each pixel is represented as an integer value such as (ix, iy)=(0, 0), (1, 0), (2, 0), . . . with the position coordinates of an upper left position of the area being assigned as a typical point. In this case, the position coordinates of the center of the pixel area are (ix+0.5, iy+0.5) (ix, iy=0, 1, 2, . . . ).

As illustrated in (a), the position coordinates (ix+0.5, iy+0.5) of the center of a pixel 360 in the original image is displaced by an amount corresponding to a displacement vector (dx2, dy2) according to movement of the viewpoint. Then, in many cases, the position coordinates are misaligned with the center of a displacement destination pixel 362. Determination of an image reference vector for the pixel 362 only from this displacement vector may vary the accuracy according to the amount of misalignment. Thus, surrounding displacement vectors are taken into account in units of subpixels.

Specifically, as illustrated in (b), in addition to the displacement from the position coordinates (ix+0.5, iy+0.5) of the center of the target pixel 360, displacements from a point 364a (ix+1.0, iy+0.5), a point 364b (ix+0.5, iy+1.0), and a point 364c (ix+1.0, iy+1.0) are determined; the point 364a (ix+1.0, iy+0.5) is located at a distance of half a pixel rightward from the center, the point 364b (ix+0.5, iy+1.0) is located at a distance of half a pixel downward from the center, and the point 364c (ix+1.0, iy+1.0) is located at a distance of half a pixel rightward and downward from the center. That is, a displacement vector is determined for four points, and each point is displaced by a distance corresponding to the displacement vector to obtain the position coordinates resulting from the displacement. Furthermore, digits of the position coordinates after the decimal point are rounded down to obtain integer values indicative of the displacement destination pixel. Note that the distance at which a displacement vector is acquired is not limited to the length corresponding to half a pixel and that any distance may be used as long as the distance is shorter than the length of one side of the pixel area.

Figure 16:
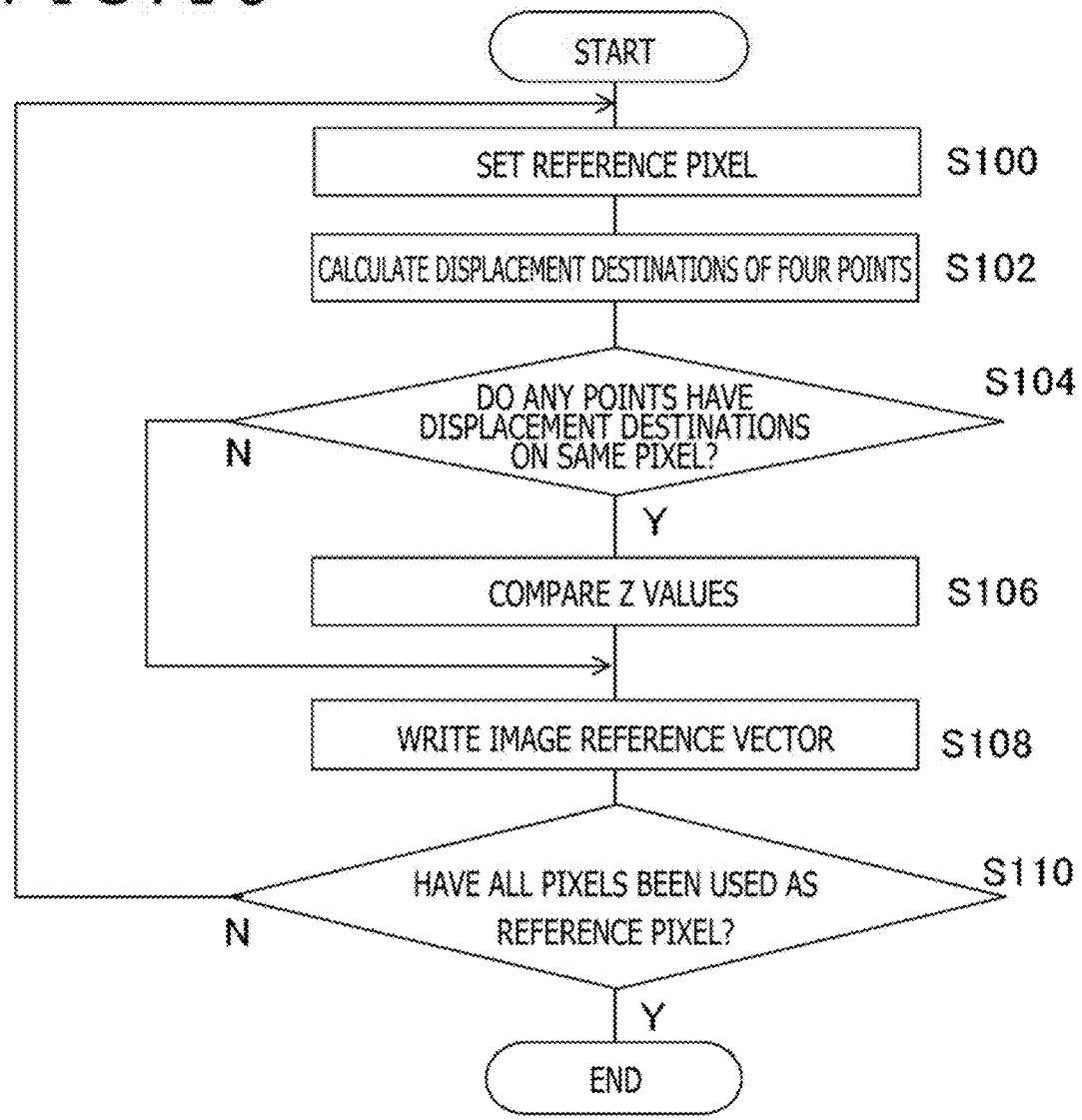
FIG. 16 is a flowchart schematically illustrating a processing procedure for determining an image reference vector for each of pixels on an image reference vector map according to the present embodiment.

In the illustrated example, two points have displacement destinations on the same pixel 362. In this case, one of the points is selected by a comparison of the Z value. The Z value is determined for each of the pixels in the original image from the parallax value image corresponding to the original image. FIG. 16 is a flowchart schematically illustrating a processing procedure for determining an image reference vector for each of the pixels on the image reference vector maps. First, one of the pixels on the image reference vector maps is set as a reference pixel (S100), and for total four points including the center of the reference pixel and three points near the center, displacement destinations are calculated according to movement of the viewpoints (S102).

Whether any other displacement vector has an overlapping destination pixel is determined (S104), and in a case where a certain displacement vector includes an overlapping destination pixel, the Z values of the corresponding displacement vectors are compared with each other (Y in S104, S106). An inverse vector of a displacement vector having a Z value closer to the viewpoint is written as an image reference vector for the displacement destination pixel (S108). In S104, in a case where no other displacement vector has an overlapping destination pixel, the inverse vector of the displacement vector is written as an image reference vector for the displacement destination pixel (N in S104, S108). Note that, when any other displacement vector has an overlapping destination pixel in the subsequent calculation of a reference pixel, overwrite may also occur as a result of the Z comparison, the write destination in S108 is a buffer memory for the image reference vector maps.

Before all the pixels in the original image are each set as a reference pixel (N in S110), the processing from S100 to S108 is repeated. When all the pixels are each set as a reference pixel, the processing is ended (Y in S110). As described above, displacement vectors are determined in units of subpixels, and an image reference vector is selected from the displacement vectors. This method uniformizes the accuracy compared to a method of determining displacement vectors in units of pixels, and interpolating the displacement vectors to determine the image reference vector. As a result of checking of displacement vectors at a distance of 0.5 pixels from one another, the maximum error in the position of the reference destination of an image reference vector is 0.25 pixels, and the accuracy is thus improved.

Thus, the image reference vector is obtained by using each of the center of each pixel on the original image and the neighborhoods of the center as a start point to determine a displacement destination pixel resulting from movement of the viewpoint. With such a procedure, even displacement vectors including start points proximate to each other in the original image may include spaced end points, and as a result, no image reference vector may be set for a certain pixel (hereinafter, referred to as "hole"). This is due to, for example, a part of the original image being elongated at a pixel level by movement of the viewpoint. As described above, a possible hole is inhibited by determining displacement vectors in units smaller than pixels to create end points larger in number than the pixels. However, a pixel not corresponding to an end point or a hole may result due to enlargement or the like. Thus, the original image manipulating section 254 utilizes surrounding pixels to interpolate an image reference vector.

Figure 17:
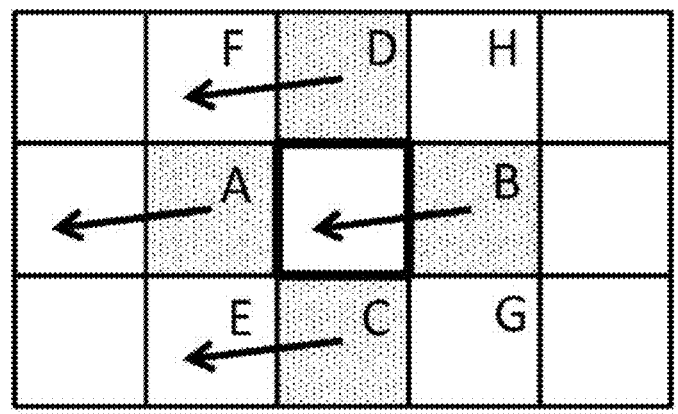
FIG. 17 is a diagram illustrating a method for interpolating image reference vectors according to the present embodiment.

FIG. 17 is a diagram illustrating an method for interpolating image reference vectors. In a pixel arrangement illustrated in FIG. 17, a hole of an image reference vector is assumed to be present in a pixel enclosed by a thick-line frame. In this case, the simplest method may be to interpolate the image reference vector by an average value for image reference vectors set for surrounding pixels. However, the image reference vectors used for the interpolation are obtained from a displacement vector based on movement of the viewpoint, and the use of a vector obtained by interpolation further for interpolation is avoided.

For example, in a case where pixels (pixels D, C, D, A, B) above, below, on the left of, and on the right of a target pixel enclosed by a thick-line frame are provided with image reference vectors as illustrated by arrows, the average vector of the four image reference vectors is set as a target image reference vector. Alternatively, a weight varying according to the position with respect to the target pixel may be applied, and the average may be determined. For example, a double weight is applied to upper, lower, left, and right pixels (pixels D, C, D, A, B) included in eight surrounding pixels, and a weighted average is calculated for image reference vectors for the eight pixels A to H.

Alternatively, pixels or weights used for interpolation may be determined in accordance with the directionality of image reference vectors. For example, in the illustrated example, all the image reference vectors for the surrounding pixels are approximately horizontal. Thus, the target portion is assumed to have been elongated in the horizontal direction with respect to the original image, leading to the hole. Thus, in this case, accurate interpolation corresponding to the circumstances can be achieved by using, for linear interpolation, the left and right pixels A and B, included in the pixels around the target, or applying a heavier weight to the pixels A and B and averaging the corresponding vectors.

For example, an average vector is determined for the image reference vectors for the four pixels located above, below, on the left of, and on the right of the target pixel, and when an angle θ between the average vector and the horizontal direction (X-axis direction) is −30°<θ<30° or 150°<θ<210°, the image reference vectors for the left and right pixels A and B are averaged to obtain a target image reference vector. When the 60°<θ<120° or 240°<θ<300°, the image reference vectors for the upper and lower pixels D and C are averaged to obtain a target image reference vector. When the angle θ has any other value, the image reference vectors for the upper, lower, left, and right pixels are averaged to obtain a target image reference vector.

Note that various combinations of aspects are possible, for example, thresholds for the angles as described above, and whether to select pixels used for interpolation or to vary the weight on the basis of the thresholds. The head of the viewer more often moves in the horizontal direction than in the vertical direction, and as a result, the pixels are also assumed to be displaced more often in the horizontal direction. Thus, the speed of processing may be increased with accuracy maintained by constantly using, for interpolation, the image reference vectors for the left and right pixels instead of determining the angle as described above.

In the present embodiment, as described above, even in a case where the image is locally elongated due to movement of the viewpoint, the calculating formula can be selected on the basis of directionality by using a vector as an interpolation target. Additionally, actual manipulation of the color values is limited to the final stage of drawing of the display image, thus suppressing the adverse effect of the interpolation processing on the quality of the display image. For example, in a case where no image reference vectors are introduced and a color image is directly interpolated, such adjustment based on directionality is disabled.

For example, even in a case where a hole results from elongation in one direction, the color image includes no corresponding information, and thus, similar interpolation calculation is executed regardless of the direction in which the image has been elongated. As a result, an unwanted color is mixed, affecting the quality of the display image. Image reference vectors characteristically express movement of pixels caused by movement of the viewpoint, and thus, no significant change occurs in units of pixels as illustrated in FIG. 17. As a result, even in a case where pixels around the target are utilized for interpolation regardless of directionality, no significant error is likely to occur, and degradation of image quality caused by color mixture can be prevented.

Note that the above-described interpolation method is based on the assumption that what is called valid image reference vectors derived from displacement vector calculation have been provided to the surrounding pixels. On the other hand, in a case where two or more pixels continuously form a hole, a surrounding image reference vector that is not an interpolation may be searched for and used directly for interpolation. For example, in FIG. 17, a rule for the priorities of searches is set for eight pixels around the target. As an example, in the order of the pixels A, B, C, D, E, F, G, and H is possible. Searches are performed in this order, and the first detected image reference vector that is not an interpolation is employed as a target vector. With any interpolation method, no color value is determined at the stage of generation of image reference vectors, and thus color values can finally be determined with subpixel position accuracy.

Figure 18:
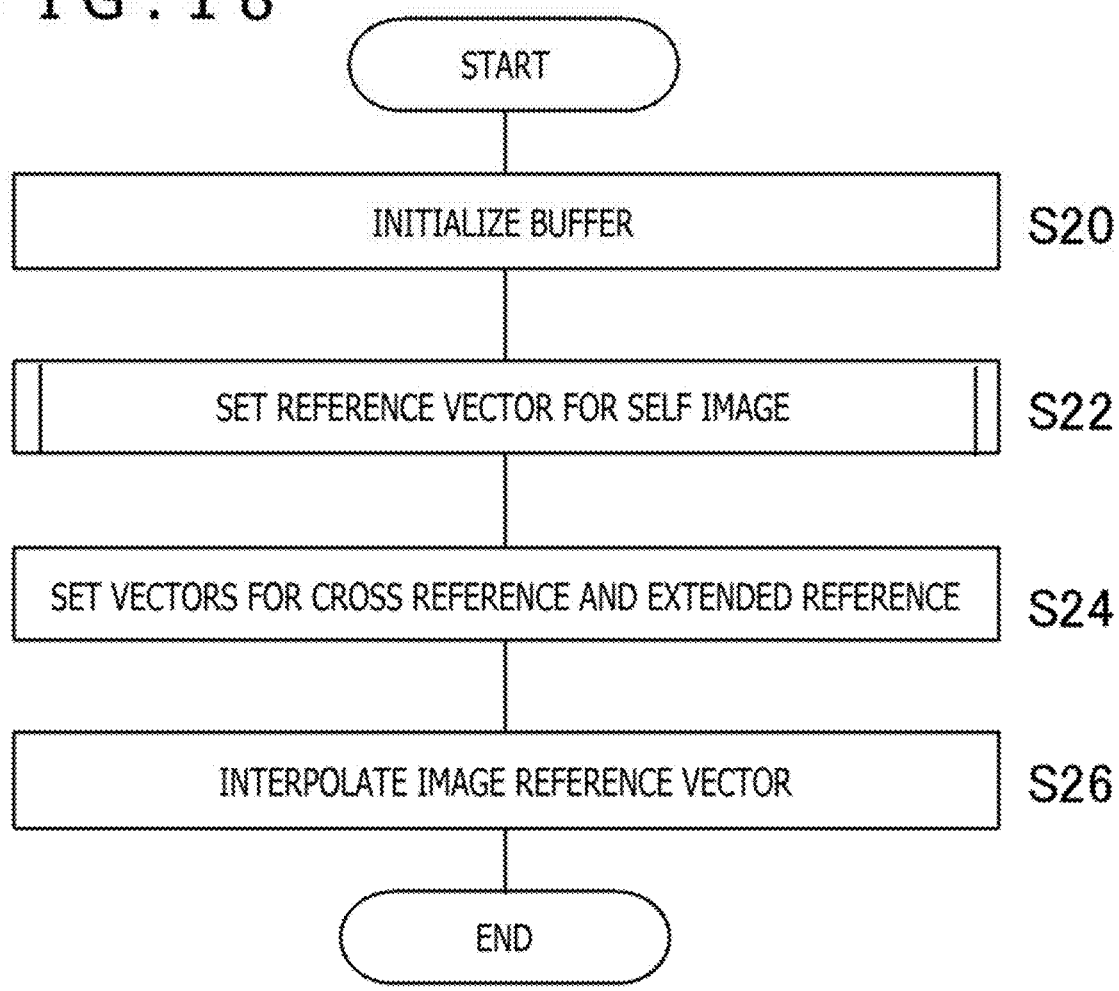
FIG. 18 is a flowchart illustrating a processing procedure in which, in S12 in FIG. 8, an original image manipulating section 254 generates an image reference vector map.

FIG. 18 is a flowchart illustrating a processing procedure in which, in S12 in FIG. 8, the original image manipulating section 254 generates an image reference vector map. First, the Z buffer and a buffer for image reference vector maps is initialized (S20). Then, an image reference vector the reference destination of which is a self image is set (S22). Here, the self image refers to a right-eye original image for a right-eye map and a left-eye original image for a left-eye map. Then, cross reference and extended reference are used to set an image reference vector the reference destination of which is an original image other than the self image (S24).

In the processing in S22 and S24, write to the Z buffer is performed in parallel. Then, a hole of the image reference vector is interpolated (S26). The processing illustrated in FIG. 18 is executed for the left eye and for the right eye to complete image reference vector maps for both eyes. Note that no object is present in pixels in the parallax value image holding no data and that no image reference vector is present that points to such pixels. As a result, the image reference vector map may contain an area located, for example, outside the image of the object in which no image reference vector map is present.

Figure 19:
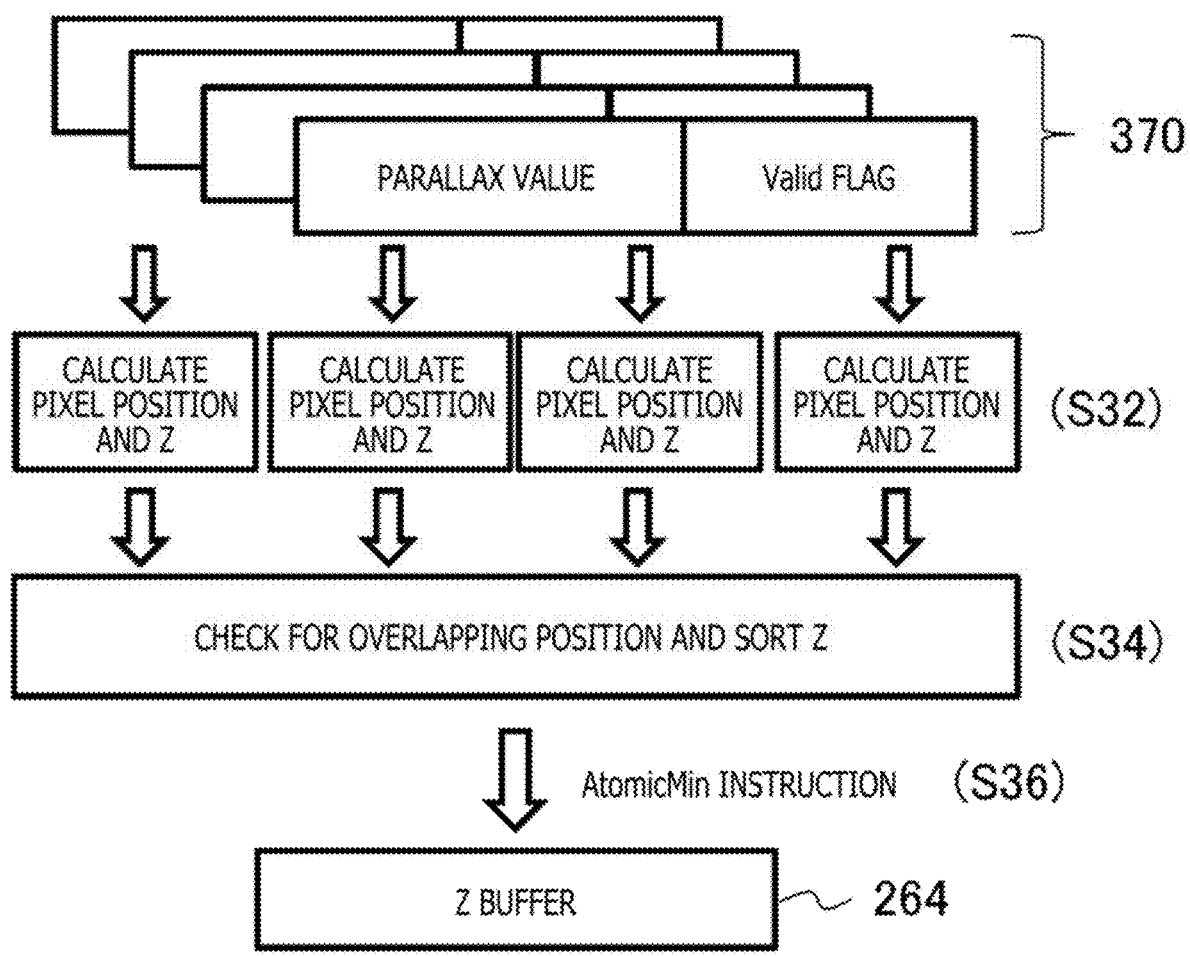
FIG. 19 is a diagram illustrating a procedure for processing of writing, in S22 in FIG. 18, to a Z buffer to generate an image reference vector the reference destination of which is a self image.

FIG. 19 illustrates a procedure for processing of writing, in S22 in FIG. 18, to the Z buffer to generate an image reference vector the reference destination of which is a self image. This figure illustrates a unit of processing using a reference pixel set in the original image and three points located at a distance of 0.5 pixels from the center of the reference pixel as illustrated in FIG. 15, with a hardware configuration taken into account. This also applies to the next FIG. 19. First, data 370 related to parallax values for the points is acquired, and respective Z values and the pixel positions of displacement destinations of displacement vectors are determined (S32). The parallax value of the reference pixel is read from the parallax value image data 260 stored in the original image data storage section 256. The parallax values of the three other points are determined by interpolation processing based on the parallax values of pixels adjacent to the reference pixel.

"Valid flag" in data 370 indicates whether the associated parallax value is valid or invalid. As described above, an area where no object is present originally has no parallax value, and thus, the Valid flag indicates invalidity. In a case where the parallax value is invalid, the subsequent processing such as calculation of displacement vectors is also invalid. By using a general pixel shader, the processing in S32 can be efficiently executed on the four points in parallel. However, parallel processing prevents determination of the order in which results are output. Thus, whether the previously output displacement destination is the same pixel as that of the subsequently output displacement destination is checked, and in a case where the previously output displacement destination is the same pixel as that of the subsequently output displacement destination, sorting is performed in the order of distance closer to the viewpoint (S34).

In a case where the displacement destinations are not the same pixel, no sorting is performed. Then, when all the results are obtained, the Z value closest to the viewpoint is written to the displacement destination pixel in the Z buffer (S36). At this time, an "AtomicMin" instruction included in the inseparable manipulation can be utilized to write the Z value closest to the viewpoint at once regardless of the output order of the parallel processing. A displacement vector for a point at a distance shorter than the pixel width as illustrated in FIG. 15 is likely to have an overlapping destination pixel. Thus, performing the Z comparison in the shader allows unwanted pixel information to be efficiently excluded, enabling a reduction in the number of accesses to the Z buffer 264. Note that identification information indicating that the reference destination is the self image is also written to the Z buffer 264 so as to gain priority over data related to cross reference and extended reference.

Figure 20:
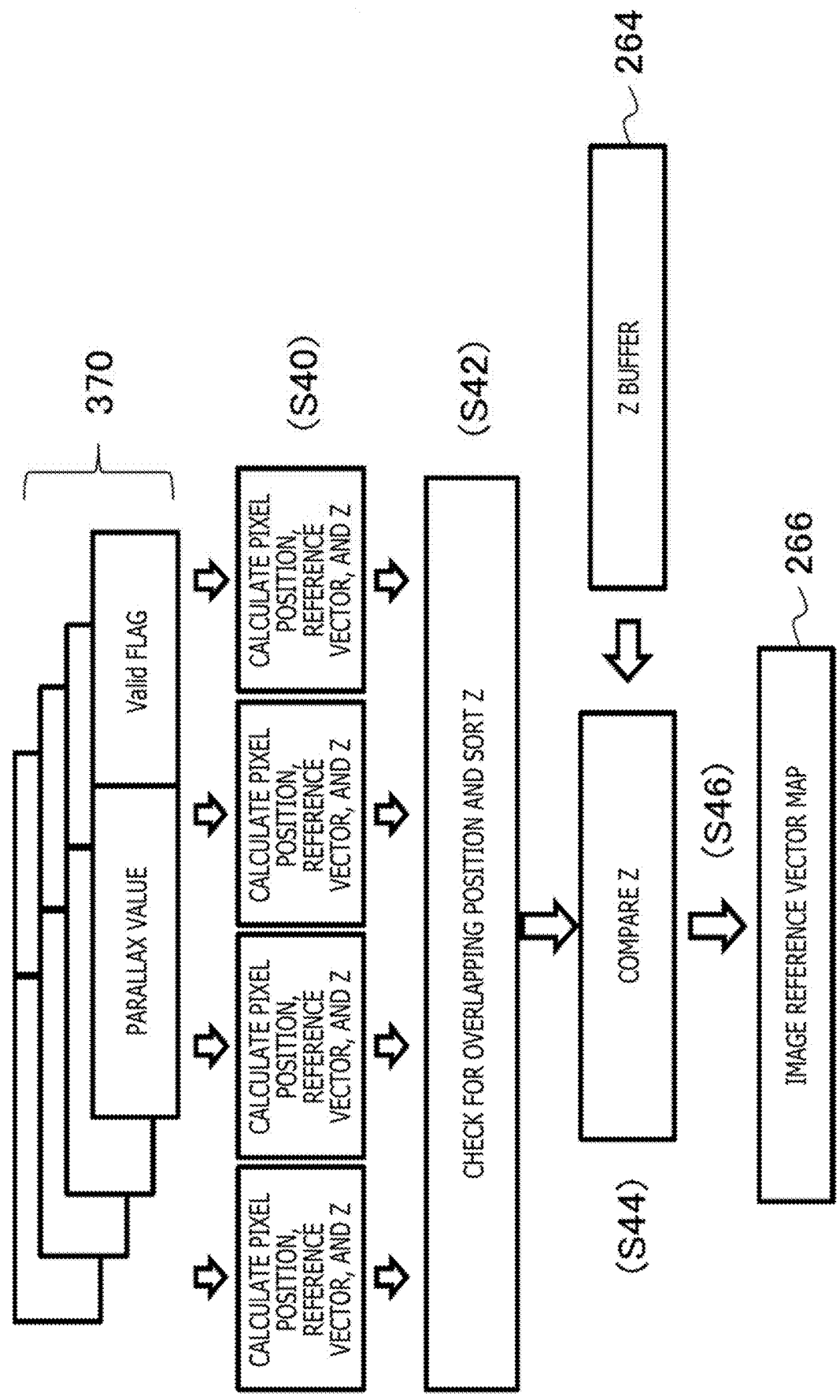
FIG. 20 is a flowchart illustrating a procedure for processing of setting, in S22 in FIG. 18, an image reference vector the reference destination of which is a self image.

FIG. 20 illustrates a procedure for processing of setting, in S22 in FIG. 18, an image reference vector the reference destination of which is a self image. First, data 370 is acquired that is related to a reference pixel set in the original image and three points located at a distance of 0.5 pixels from the center of the reference pixel, and respective Z values, the positions of displacement destinations of displacement vectors, are image reference vectors that are inverse vectors of the displacement vectors are determined (S40). Then, as is the case with S34 in FIG. 19, in a case where displacement vectors have an overlapping displacement destination pixel, the results are sorted on the basis of the Z value to determine a write candidate image reference vector for each displacement destination pixel (S42).

Then, the Z value of the pixel in the Z buffer 264 generated by the previous processing of the reference pixel is compared with the Z value for the write candidate image reference vector (S44). In a case where the Z value for the write candidate image reference vector is equal to the Z value in the Z buffer 264, the image reference vector is written to the pixel in the image reference vector map 266 (S46). In S24 in FIG. 18, in a case where an image reference vector for cross reference and extended reference is set, the image reference vector can be determined using a procedure basically similar to that illustrated in FIGS. 19 and 20, by setting a reference pixel for another image instead of the self image.

However, in a case where, when a Z buffer is created, identification information indicating that the reference destination is the self image has already written, no new write is performed on the pixel. In a case where the Z value for cross reference and extended reference is written, identification information related to the reference destination image is also written to the Z buffer. Then, when the image reference vector is written, the write is performed only in a case where identification information related to the image to be processed matches the identification information written to the Z buffer. With such processing, only for pixels in the image reference vector map that fail to be filled by reference to the self image, an image reference vector can be set the reference destination of which is another pixel.

Figure 21:
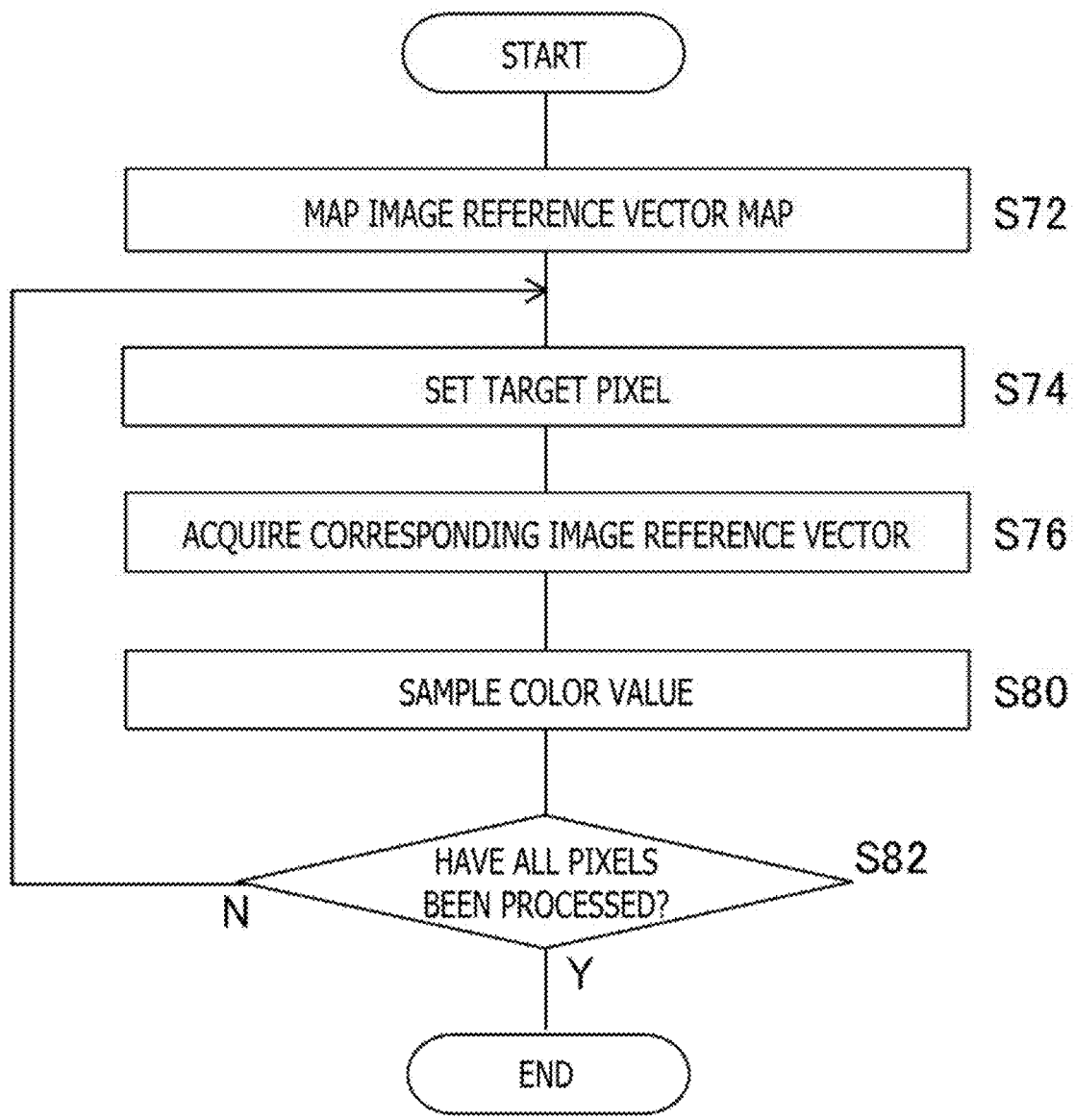
FIG. 21 is a flowchart illustrating a procedure in which, in S14 in FIG. 8, a display image generating section 268 uses the image reference vector map to generate a display image.

Now, a method for generating a final display image using the image reference vector map will be described. FIG. 21 is a flowchart illustrating a procedure in which, in S14 in FIG. 8, the display image generating section 268 uses the image reference vector map to generate a display image. First, the display image generating section 268 acquires, from the view screen control section 252, the position and posture of the view screen corresponding to the current position of the viewpoint and the current line of sight, and maps the image reference vector map to the view screen (S72). The display image generating section 268 sets a target pixel to be drawn (S74).

The display image generating section 268 then identifies a sampling point for the image reference vector map corresponding to the target pixel, and acquires the image reference vector at that position (S76). The display image generating section 268 then acquires a color value for a position in the original image indicated by the image reference vector acquired in S76, and draws the target pixel (S80). Note that, in a case where a MIP map is used for the original image, the display image generating section 268 calculates the LOD determining the MIP map level of the reference destination, and acquires a color value from the original image at the level corresponding to the LOD. The display image generating section 268 repeats the processing in S74 to S80 until all the pixels in the display image are drawn (N in S82). The display image generating section 268 ends the processing when all the pixels are drawn (Y in S82). Executing the processing on the left and right sides allows display images for the left eye and for the right eye to be generated.

Figure 22:
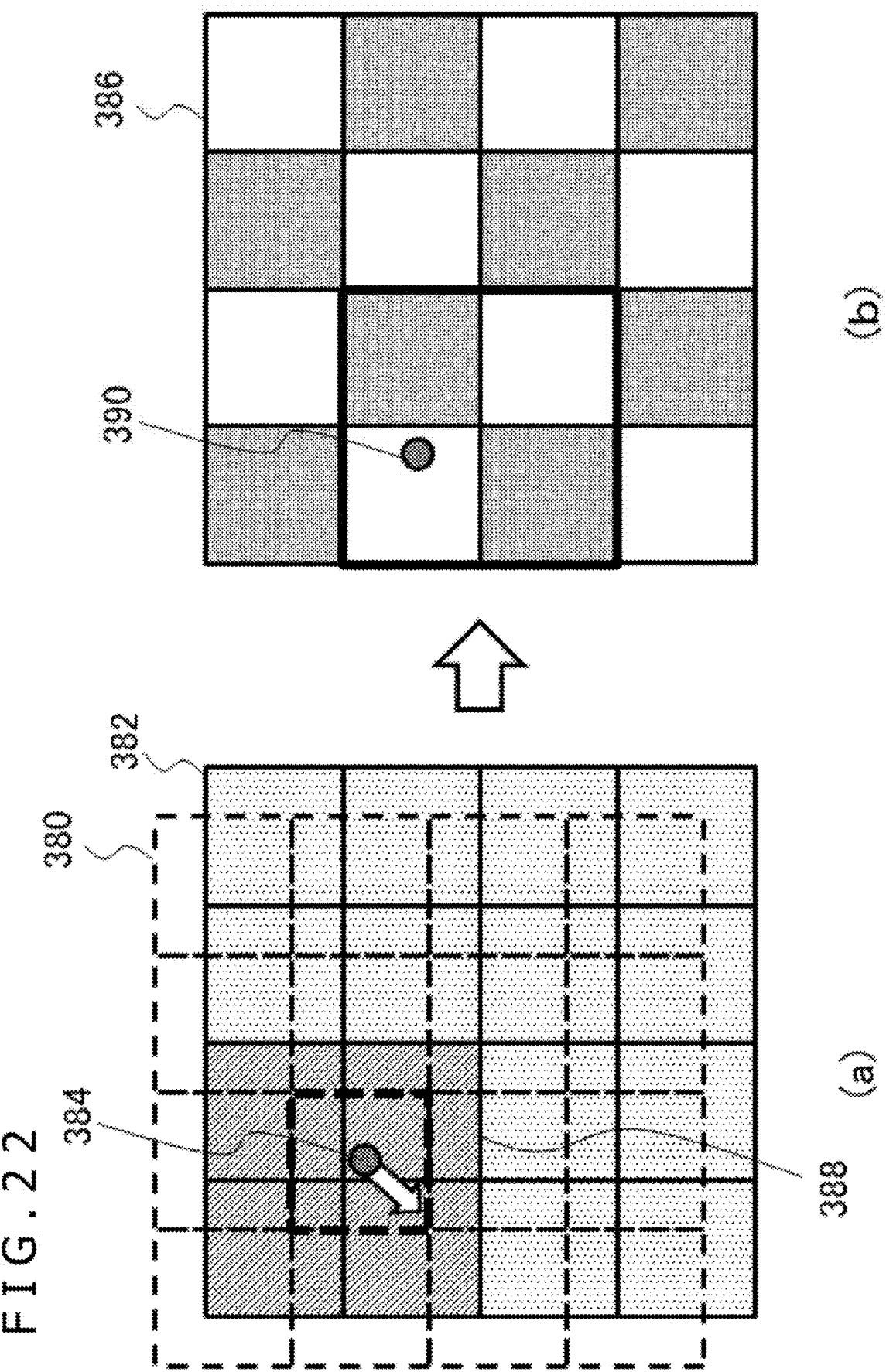
FIG. 22 is a diagram illustrating a position relationship between the display image, the image reference vector map, and the original images.

FIG. 22 is a diagram illustrating the position relationship between the display image, the image reference vector map, and the original image. In (a), a pixel array illustrated by dotted lines is a part of a display image 380, and a hatched pixel array is a part of an image reference vector map 382. The pixel arrays are illustrated in an overlapping manner so as to indicate positional correspondence. Note that the image reference vector map 382 may have a distorted shape due to perspective transformation but that FIG. 22 illustrates each pixel as a square to facilitate understanding. The pixel array in (b) is a part of an original image 386.

In the display image 380, assuming that the pixel illustrated by a thick-line frame is a pixel to be drawn, a position in a pixel 388 on the image reference vector map 382 corresponding to the position of the center of the pixel to be drawn is a sampling point 384. An image reference vector for the sampling point 384 illustrated by a blank arrow is determined, for example, on the basis of image reference vectors for four pixels in two rows and two columns and illustrated by thick hatching, the pixels including a pixel 388 including the sampling point 384 and three pixels adjacent to the pixel 388 and close to the sampling point 384. Basically, the image reference vector can be determined by interpolating the image reference vectors for the four pixels.

However, the interpolation is exceptionally not performed in cases where the reference destinations of the four image reference vectors are not the same original image, where the four pixels have significantly different Z values and are suspected to straddle a step in the object, and where any of the image reference vectors is unsuitable for interpolation. Once the image reference vector for the sampling point 384 is thus determined, a position in the original image 386 pointed to by the image reference vector is set as a sampling point 390 for the color value. Then, four pixels in two rows and two columns including the sampling point 390 for the color value are interpolated to determine the color value for the pixel to be drawn in the display image.

In such processing, in a case where the reference destinations of image reference vectors indicated by adjacent pixels in the image reference vector map 382 are also proximate to each other in the original image 386, interpolation of the image reference vectors and interpolation of the color values in the original image function appropriately, resulting in accurate color values. On the other hand, in a case where the reference destinations of the image reference vectors are spaced apart in the original image 386 or where pixels with significantly different Z values are adjacent to each other, slight movement of the viewpoint leads to a significant variation in color value, causing flickers at the time of display.

Figure 23:
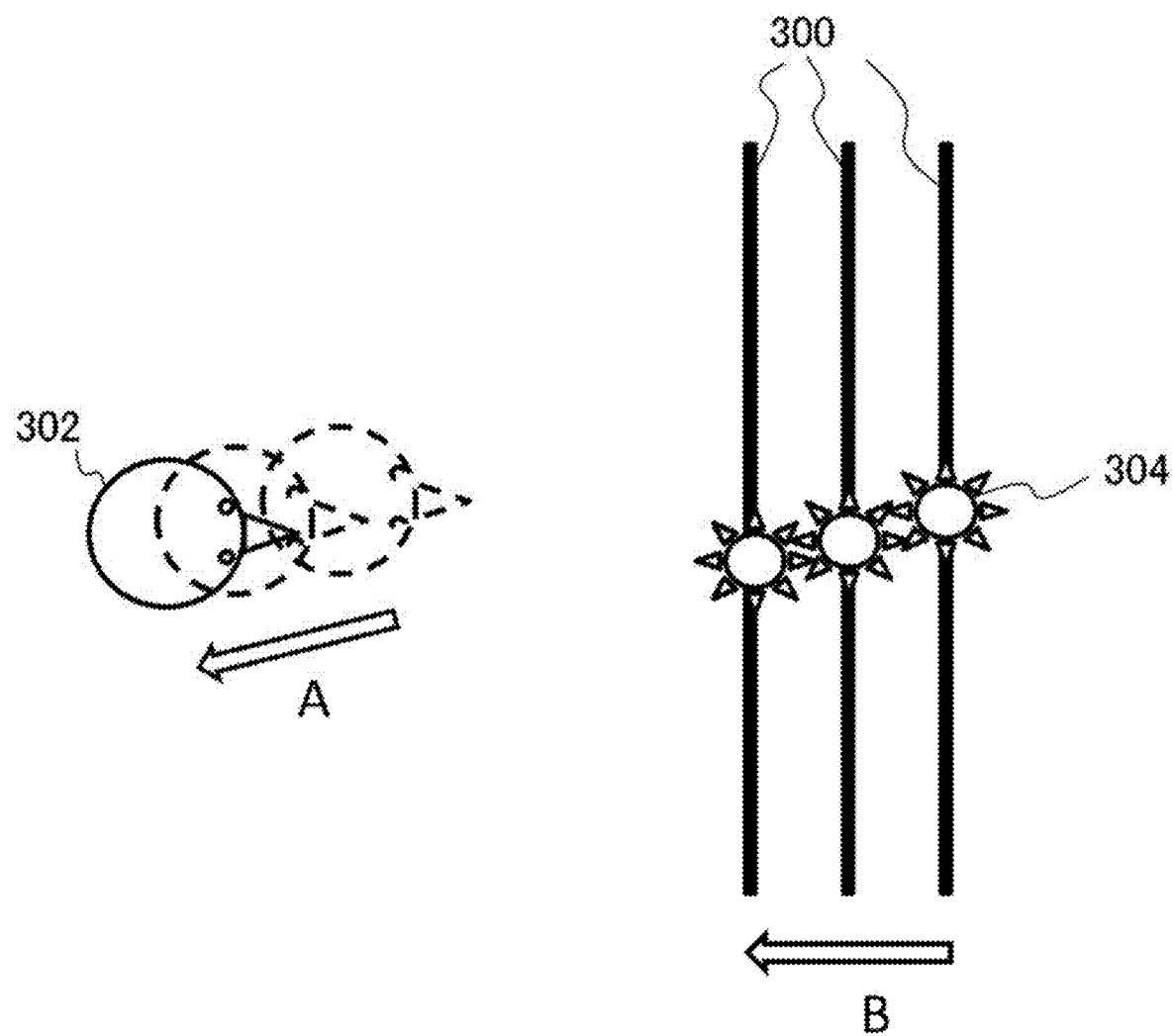
FIG. 23 is a diagram illustrating a recursive filter introduced according to the present embodiment.

Thus, a recursive filter is introduced that uses color values determined before the current frame to mitigate a variation in the color values in the current frame. FIG. 23 is a diagram illustrating a recursive filter introduced in the present embodiment. FIG. 23 is a schematic bird's eye view of a viewer 302 and a map screen 300. The viewer 302 is assumed to move as illustrated by an arrow A. At this time, as described above, while the map screen 300 is moved as illustrated by an arrow B, an image of an object 304 is also moved on the screen planes such that the object 304 appears fixed in the virtual space. However, movement of the map screen 300 itself is not essential.

In the aspects described above, for the current viewpoint, the image reference vector is determined on the current map screen, and the original image is referenced in accordance with the image reference vector to obtain color values. In a case where a recursive filter is introduced, the color values determined for the viewpoint for the preceding frame is saved as a color map 267. The color values in the preceding frame include color values in the further preceding frame, and as a result, the color map is information including the history of past color values. The original image manipulating section 254 synthesizes color values obtained from the original image for the current viewpoint with color values at corresponding positions in the color map 267 for the preceding frame to create a color map for the current frame.

As described above, the image of the same object 304 moves on the map screen 300 as the viewpoint of the viewer 302 moves. Thus, the "corresponding positions" referenced on the color map 267 for the preceding frame are not the same positions on the image plane but the same portions of the image of the same object before movement. Assuming that a color value determined from the original image for the current viewpoint is New_Color and that a color value for a corresponding position in the color map 267 for the preceding frame is Old_Color, a final color value Save_Color for the current frame is determined as follows.

Save_Color=ratio*New_Color+(1−ratio)*Old_Color

Here, "ratio" indicates a synthesis ratio, and a favorable value is determined through experiments or the like. Note that a synthesis calculation method is not limited to the above-described equation but that, for example, a higher synthesis ratio may be used for a frame temporally closer to the current frame. Once the color map is thus created, the display image generating section 268 references a position on the color map corresponding to the pixel in the display image to determine the color value for the pixel. That is, at this stage, the need to reference the original image using an image reference vector is eliminated.

Thus, even in a case where a change in the pixel to be interpolated or the like causes image reference vectors or color values determined only from the current viewpoint to change rapidly, the preceding color values for the image expressed by the pixel mitigate the change, allowing possible flickers to be inhibited. The recursive filter may be introduced for setting of color values for all the pixels or only for a portion likely to undergo flickering. In the former case, in the processing of drawing the display image, the color map may be exclusively referenced.

On the other hand, for portions in which interpolation based on data held by neighbor pixels functions favorably in sampling of image reference vectors or color values as described above, the original colors can be more vividly expressed by using image reference vectors to directly reference the original image. Thus, in a case where, in an adjacent area including a predetermined number of pixels (for example, an area of four pixels used for interpolation), there is a difference of a predetermined value or larger in the end point or Z value of an image reference vector or pixels are present for which the reference destinations are different images, the recursive filter may be applied exclusively to pixels included in the area. Only one or two or more of the above-described conditions may be applicable conditions.

Figure 24:
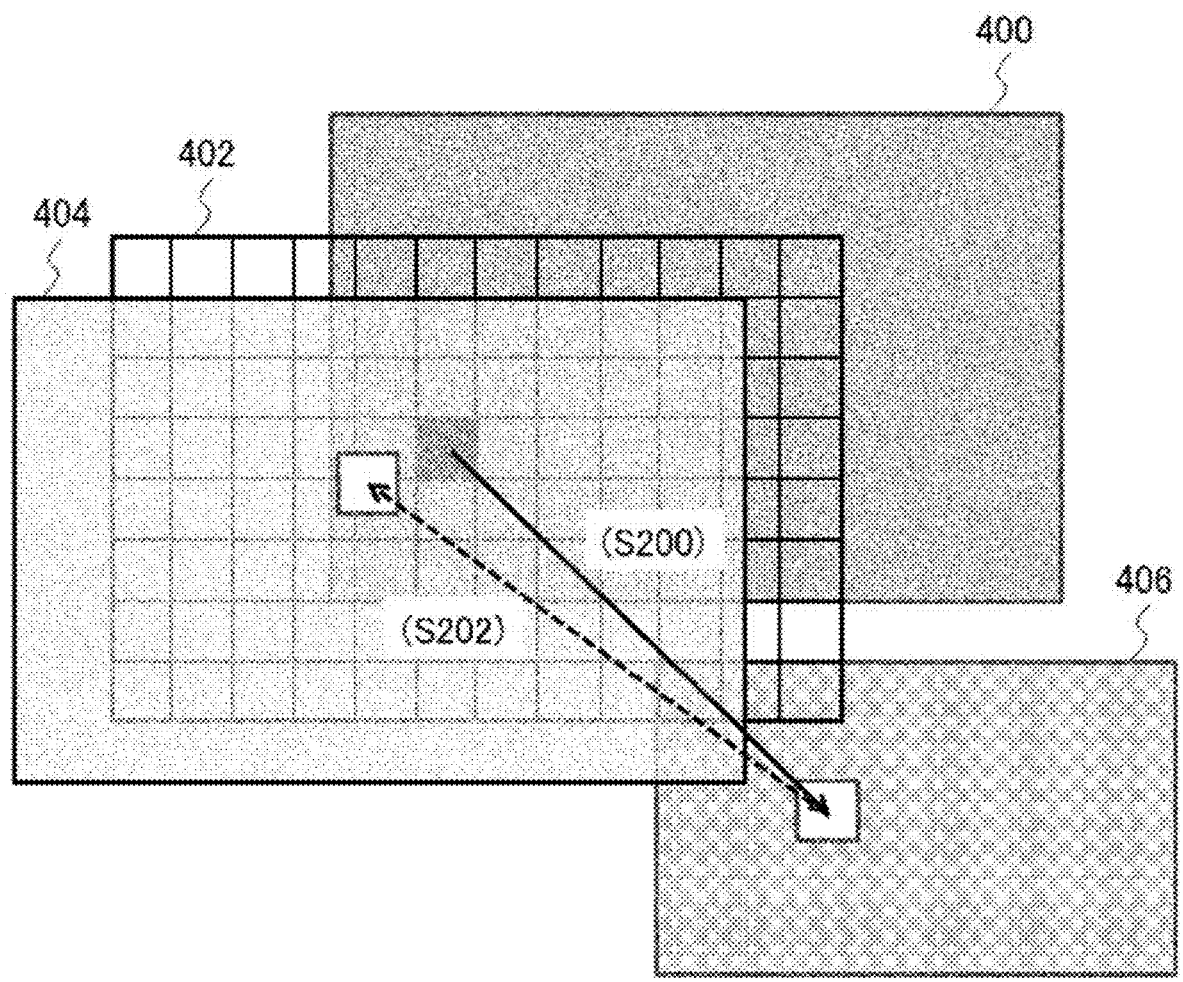
FIG. 24 is a diagram schematically illustrating a procedure for generating a color map in a case where the recursive filter is introduced.
Figure 25:
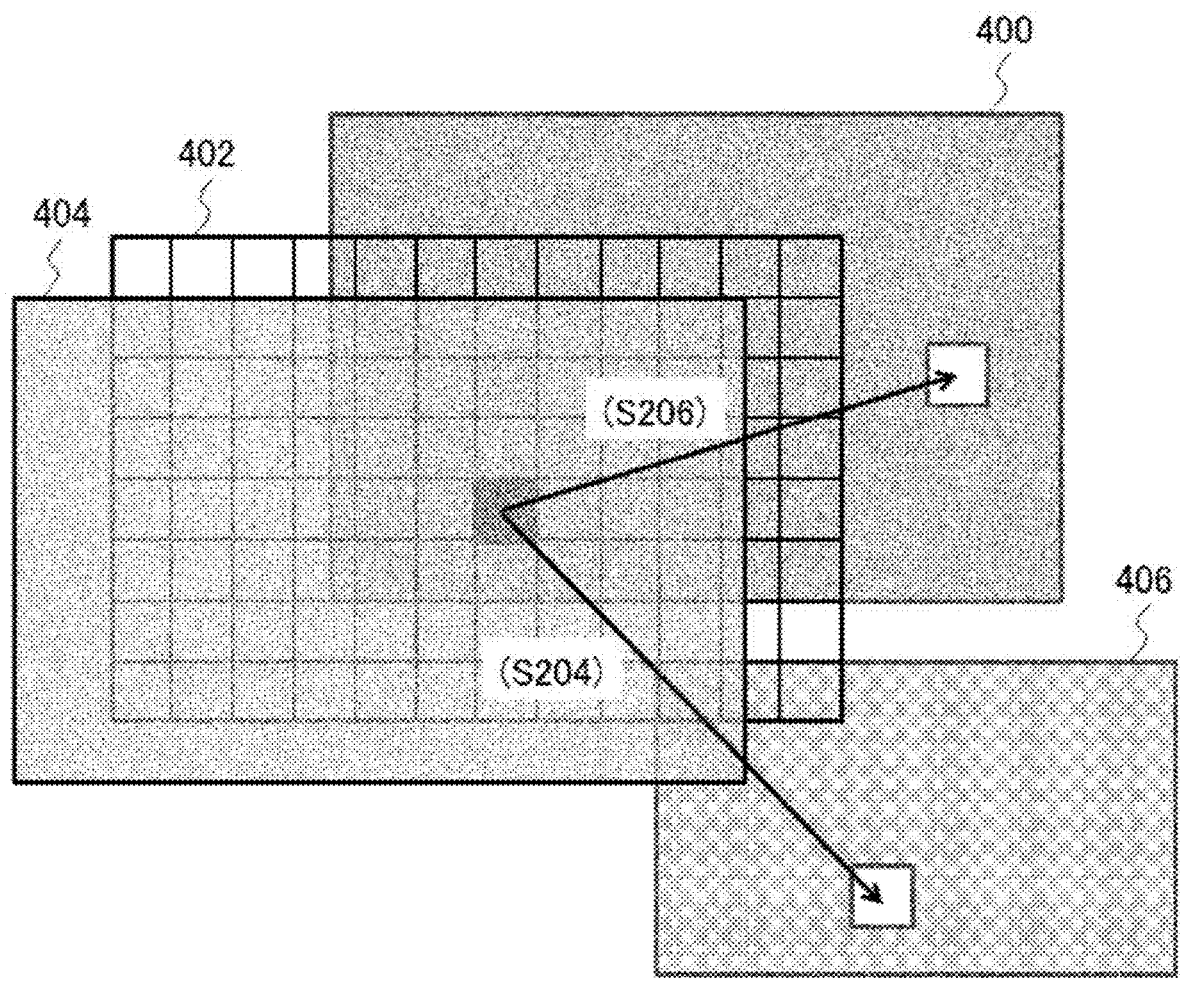
FIG. 25 is a diagram schematically illustrating the procedure for generating a color map in the case where the recursive filter is introduced.
Figure 26:
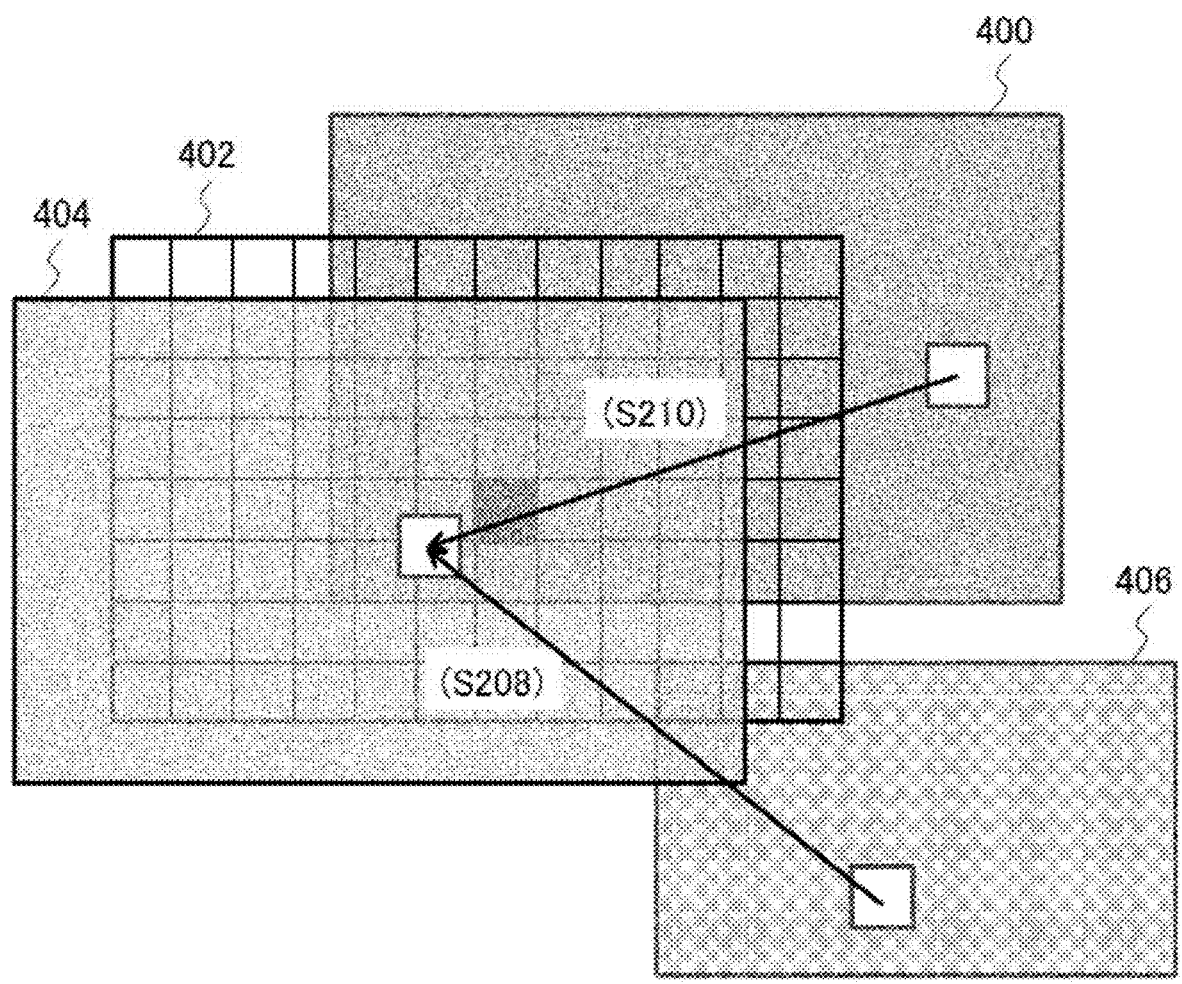
FIG. 26 is a diagram schematically illustrating the procedure generating a color map in the case where the recursive filter is introduced.

FIGS. 24 to 26 schematically illustrate a procedure for generating a color map in a case where the recursive filter is introduced. First, FIG. 24 illustrates a procedure for determining a color value for a pixel in the color map to which the recursive filter is not applied. First, an original image 406 is referenced on the basis of an image reference vector for a target pixel in an image reference vector map 402 generated for the current viewpoint (S200). Then, the color value of the reference destination is appropriately filtered to determine a color value, which is then written to the corresponding pixel in the color map 404 (S202). That is, in this case, a color map 400 generated for the preceding frame is not used.

FIG. 25 illustrates first-stage processing of determining a color value for a pixel to which the recursive filter is applied. First, as is the case with FIG. 24, the original image 406 is referenced on the basis of an image reference vector for a target pixel in the image reference vector map 402 generated for the current viewpoint (S204). Furthermore, a position in the color map 400 generated for the preceding frame, the position corresponding to the target pixel, is determined and referenced. That is, a displacement vector for the object is calculated that corresponds to movement of the viewpoint from the preceding frame for which the color map 400 has been generated until the current point in time, and an inverse vector of the displacement vector is tracked to determine the "corresponding position."

FIG. 26 illustrates second-stage processing executed after the processing in FIG. 25 to determine the color value for the pixel to which the recursive filter is applied. That is, assuming that a color value determined from the reference destination in the original image 406 in S204 in FIG. 25 is New_Color and that a color value determined from the reference destination in the color map 400 for the preceding frame in S206 in FIG. 25 is Old_Color, Save_Color is determined in accordance with the above-described equation and is written to the corresponding pixel in the color map 404 (S208, S210). The processing in FIGS. 24 to 26 is repeated using each of all the pixels in the image reference vector map 402 as a target pixel, to complete a color map 404 for the current frame. When the next frame is drawn, the color map 404 replaces the color map 400.

Figure 27:
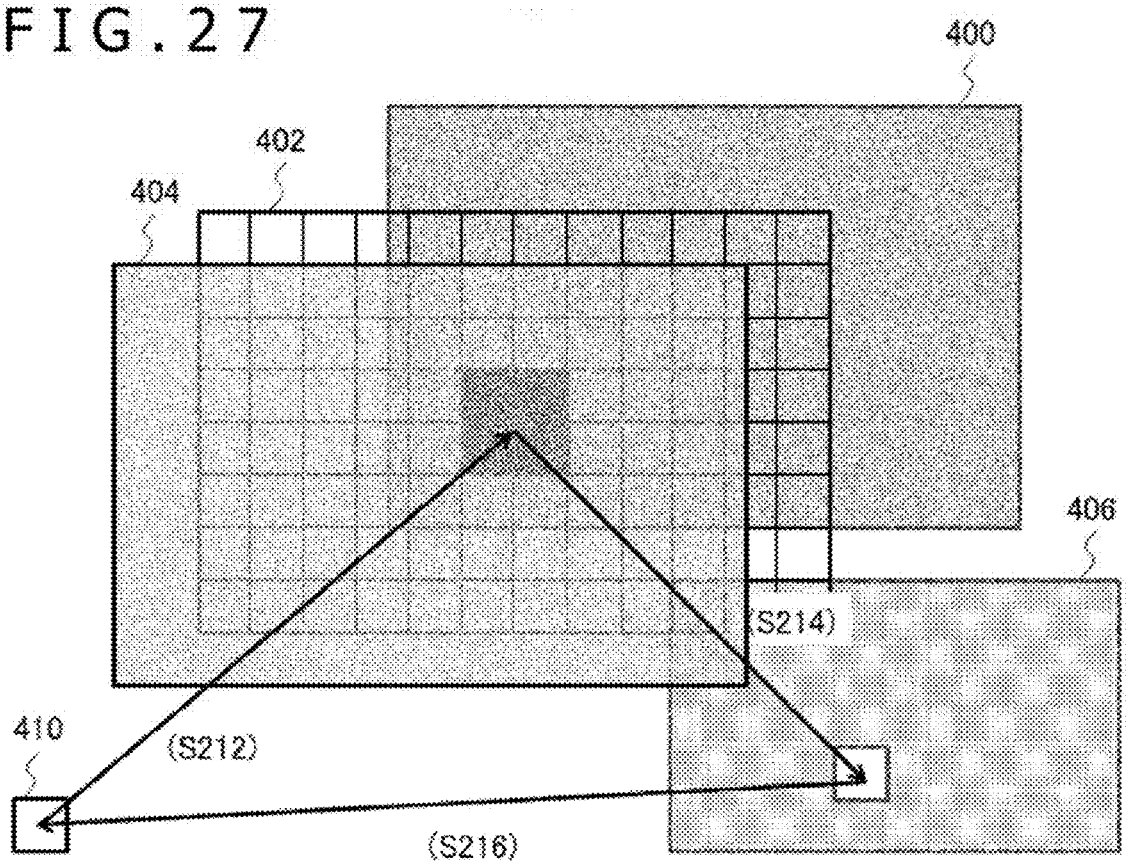
FIG. 27 is a diagram schematically illustrating a procedure in which the display image generating section according to the present embodiment determines, for pixels to which the recursive filter is not applied, a color value for each of the pixels in the display image.

FIG. 27 schematically illustrates a procedure in which the display image generating section 268 determines a color value for each of those pixels in the display image to which the recursive filter is not applied. In this case, as illustrated in FIG. 22, for each pixel 410 in the display image, a sampling point in the image reference vector map 402 is determined (S212), and surrounding image reference vectors are interpolated to determine a reference destination in the original image 406 (S214). Then, for example, the color value of the reference destination is filtered to determine a color value for the pixel 410 in the display image (S216).

Figure 28:
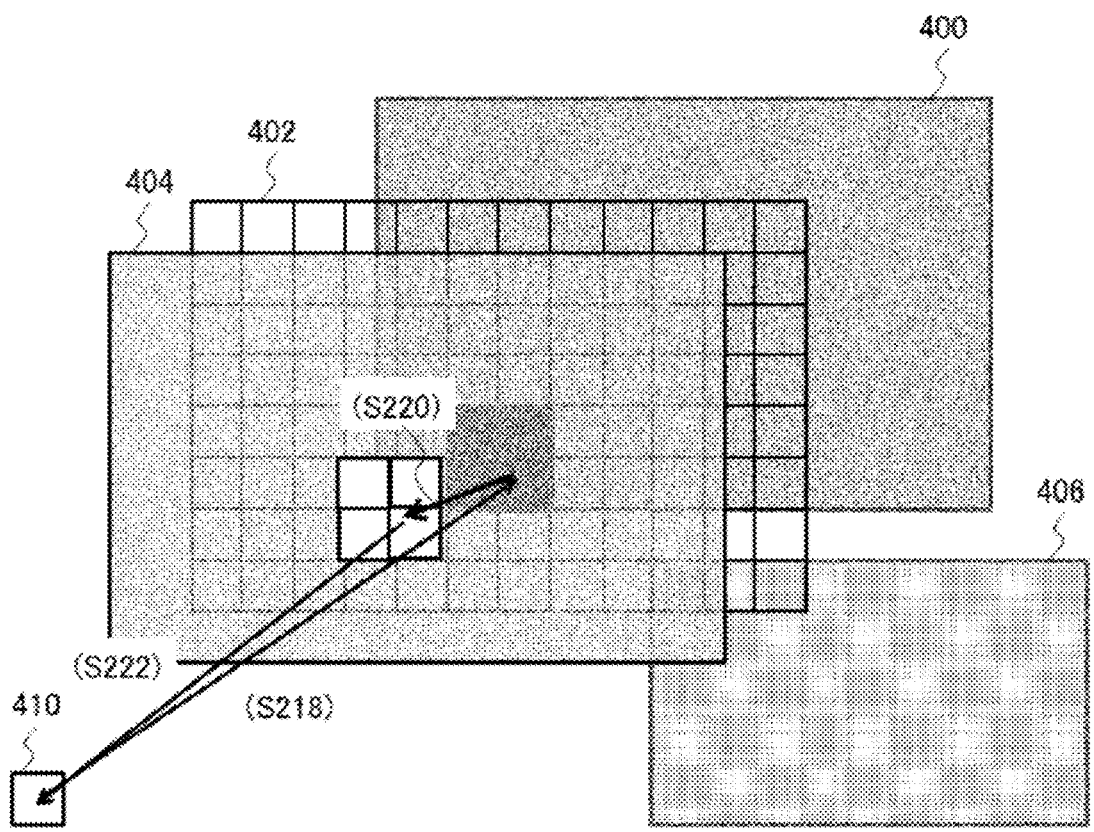
FIG. 28 is a diagram schematically illustrating a procedure in which the display image generating section according to the present embodiment determines, for pixels to which the recursive filter is applied, a color value for each of the pixels in the display image.

FIG. 28 schematically illustrates a procedure in which the display image generating section 268 determines a color value for each of those pixels in the display image to which the recursive filter is applied. First, as is the case with FIG. 27, for each pixel 410 in the display image, a sampling point in the image reference vector map 402 is determined (S218). Then, a position in the color map 404 for the current frame corresponding to the sampling point is referenced (S220). Then, pixels around the sampling point in the color map 404 are interpolated to determine a color value for the pixel 410 in the display image (S222).

In such processing, the color maps 400 and 404 are generated on an image plane corresponding to the current image reference vector map. Thus, for the processing in S206 in FIG. 25, that is, to determine, from a position in the image reference vector map 402 for the current frame, a corresponding position in the color map 400 for the preceding frame, displacement of the position of the image between the image reference vector maps needs to be determined.

Figure 29:
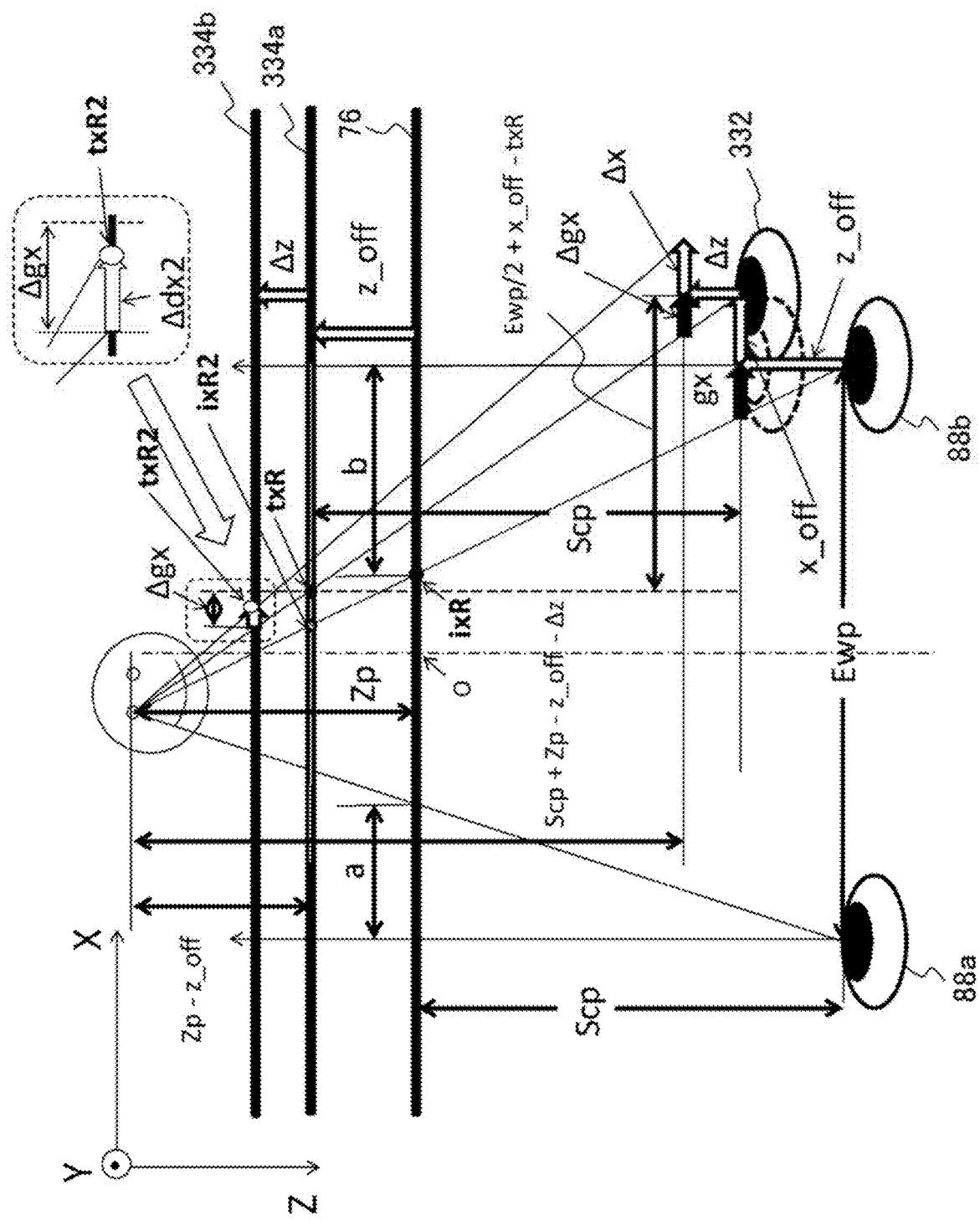
FIG. 29 is a diagram illustrating a relationship between moving distance components in the Z-axis direction and the X-axis direction included in the moving distance of the viewpoint and the corresponding moving distance of each of the pixels between image reference vector maps according to the present embodiment.

FIG. 29 is a diagram illustrating a relationship between moving distance components in the Z-axis direction and the X-axis direction included in the moving distance of the viewpoint and the corresponding moving distance of each of the pixels between image reference vector maps. FIG. 29 illustrates movement of the right eye, and the viewpoints 88a and 88b, used as base points, the viewpoint 332 of the right eye resulting from movement, and displacement of pixels from the image screen 76 onto a map screen 334a caused by the movement are similar to those illustrated in FIG. 11. The image reference vector map for the preceding frame is assumed to be generated on the map screen 334a.

Assuming that, by the point in time of the next frame, the right eye further moves by $-\Delta Z$ in the Z-axis direction and by $\Delta x$ in the X-axis direction, a map screen 334b for the current frame moves by $-\Delta Z$ from the map screen 334a for the preceding frame. Then, the moving destination txR2 of the pixel in the state in FIG. 11 further moves to a position txR2 on the map screen 334b. In FIG. 29, the area is enlarged and illustrated in the upper right.

First, assuming that the moving distance in the X-axis direction resulting from the viewpoint and the map screen by $\Delta Z$ is $\Delta gx$, the following is satisfied on the basis of the similarity of triangles.

$$\Delta z : \Delta gx = Scp : Exp/2 + x\_\text{off} - txR$$

Thus, the moving distance $\Delta gx$ is determined s follows.

$$\Delta gx = (Ewp/2 + x\_\text{off} - txR) * \Delta z / Scp$$

Additionally, assuming that a moving distance on the map screen 334b resulting from substantial movement of the viewpoint by $\Delta gx + \Delta x$ in the X-axis direction is $\Delta dx2$, the following is satisfied on the basis of the similarity of triangles.

$$\Delta gx + \Delta x : \Delta dx2 = Scp + Zp - z\_\text{off} - \Delta z : Zp - z\_\text{off} - \Delta z$$

Thus, the moving distance $\Delta dx2$ is determined as follows.

$$\Delta dx2 = (Zp - z\_\text{off} - \Delta z) * (\Delta gx + \Delta x) / (Scp + Zp - z\_\text{off} - \Delta z)$$

The start point of $\Delta dx2$ moves by $-\Delta gx$ according to movement of the map screen by $\Delta z$, and the amount of displacement from txR to txR2 is finally $\Delta dx2 - \Delta gx$. To reference the color map for the preceding frame from the image reference vector map for the current frame, the reference destination may be set as a position displaced in the X-axis direction by $-dx2 + \Delta gx$ corresponding to the above-described amount of displacement with positive or negative signs reversed.

Similar calculation may be executed also for the left eye. Substituting the following equations for $-\Delta dx2 + \Delta gx$ results in a distance to the reference destination in the X-axis direction.

$$\Delta gx = -(Ewp/2 - x\_\text{off} + txL) * \Delta z / Scp$$

$$\Delta dx2 = (Zp - z\_\text{off} - \Delta z) * (\Delta gx + \Delta x) / (Scp + Zp - z\_\text{off} - \Delta z)$$

Figure 30:
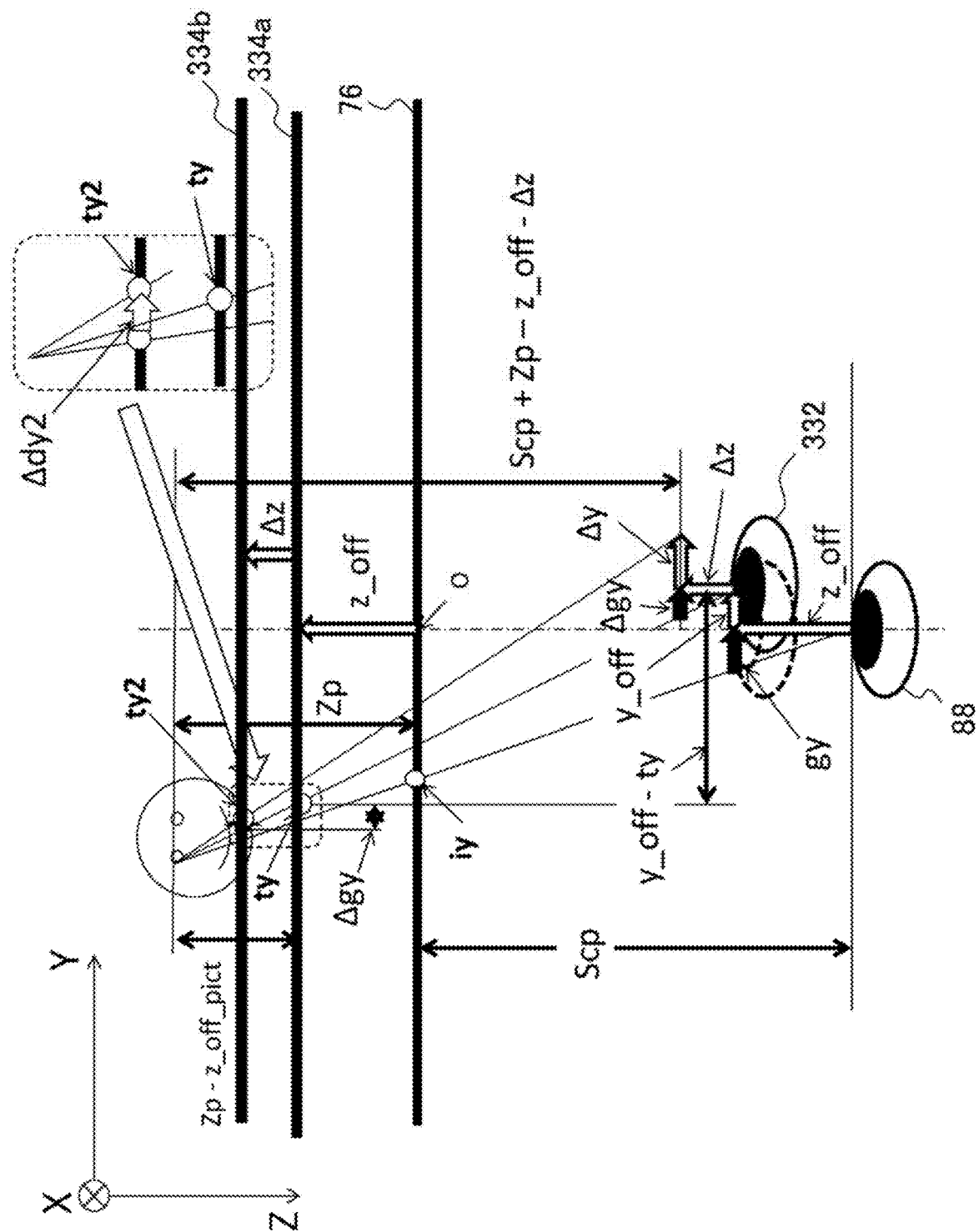
FIG. 30 is a diagram illustrating a relationship between moving distance components in the Z-axis direction and the Y-axis direction included in the moving distance of the viewpoint and the corresponding moving distance of each of the pixels between image reference vector maps according to the present embodiment.

FIG. 30 is a diagram illustrating a relationship between moving distance components in the Z-axis direction and the Y-axis direction included in the moving distance of the viewpoint and the corresponding moving distance of each of the pixels between image reference vector maps. The viewpoint 88 used as a base point, the viewpoint 322 resulting from movement, and displacement of pixels from the image screen 76 onto a map screen 334a caused by the movement are similar to those illustrated in FIG. 12. The map screen 334a is assumed to belong to the preceding frame, and the viewpoint is assumed to further move by $-\Delta Z$ in the Z-axis direction and by $\Delta Y$ in the Y-axis direction by the point in time of the next frame. At this time, the map screen 334b for the current frame moves by $-\Delta Z$ from the map screen 334a for the preceding frame.

Then, the moving destination ty of the pixel in the state in FIG. 12 further moves to a position ty2 on the map screen 334b. In FIG. 30, the area is enlarged and illustrated in the upper right. First, assuming that a moving distance in the Y-axis direction resulting from movement of the viewpoint and the map screen by $\Delta Z$ is $\Delta gy$, the following is satisfied on the basis of the similarity of triangles.

$$\Delta z : \Delta gy = Scp : y\_\text{off} - ty$$

Thus, the moving distance $\Delta gx$ is determined as follows.

$$\Delta gy = (y\_\text{off} - ty) * \Delta z / Scp$$

Additionally, assuming that a moving distance on the map screen 334b resulting from substantial movement of the viewpoint by $\Delta gy + \Delta y$ in the Y-axis direction is $\Delta dy2$, the following is satisfied on the basis of the similarity of triangles.

$$\Delta gy + \Delta y : \Delta dy2 = Scp + Zp - z\_\text{off} - \Delta z : Zp - z\_\text{off} - \Delta z$$

Thus, the moving distance $\Delta dx2$ is determined as follows.

$$\Delta dy2 = (Zp - z\_\text{off} - \Delta z) * (\Delta gy + \Delta y) / (Scp + Zp - z\_\text{off} - \Delta z)$$

The start point of $\Delta dy2$ moves by $-\Delta gy$ according to movement of the map screen by $\Delta z$, and the amount of displacement from ty to ty2 is finally $\Delta dy2 - \Delta gy$. To reference the color map for the preceding frame from the image reference vector map for the current frame, the reference destination may be set as a position displaced in the Y-axis direction by $-dy2 + \Delta gy$ corresponding to the above-described amount of displacement with the positive and negative signs reversed. This relationship is common to the right and left eyes.

Another method for acquiring a reference destination on the color map may involve saving the image reference vector map for the preceding frame along with the color map and acquiring the pixel position in the preceding frame as a reference destination on the basis of changes in the image reference vector for the same pixel. However, in this case, exception handling needs to be executed in a case where the original image for the reference destination varies between the frames. Additionally, a storage area in which the image reference vector map for the preceding frame is stored is further needed. Accordingly, a method for deriving a reference destination on the basis of the virtual space as illustrated in FIGS. 29 and 30 is selected.

Unlike in an aspect in which an object is defined in a three-dimensional space and projected on a screen plane, original information related to the image displayed as described above is two-dimensional information related to parallax images. Thus, depending on the moving distance of the viewpoint, only the pixels in the original image or an image for extended reference are insufficient for expressing all the pixels in the display image, and holes or gaps may occur. In this case, the contour of the image of the object may be deformed or pixels may appear to be floating apart. Additionally, aliasing or flickering may occur. This may also be caused by a tilt of the head of the viewer.

Figure 31:
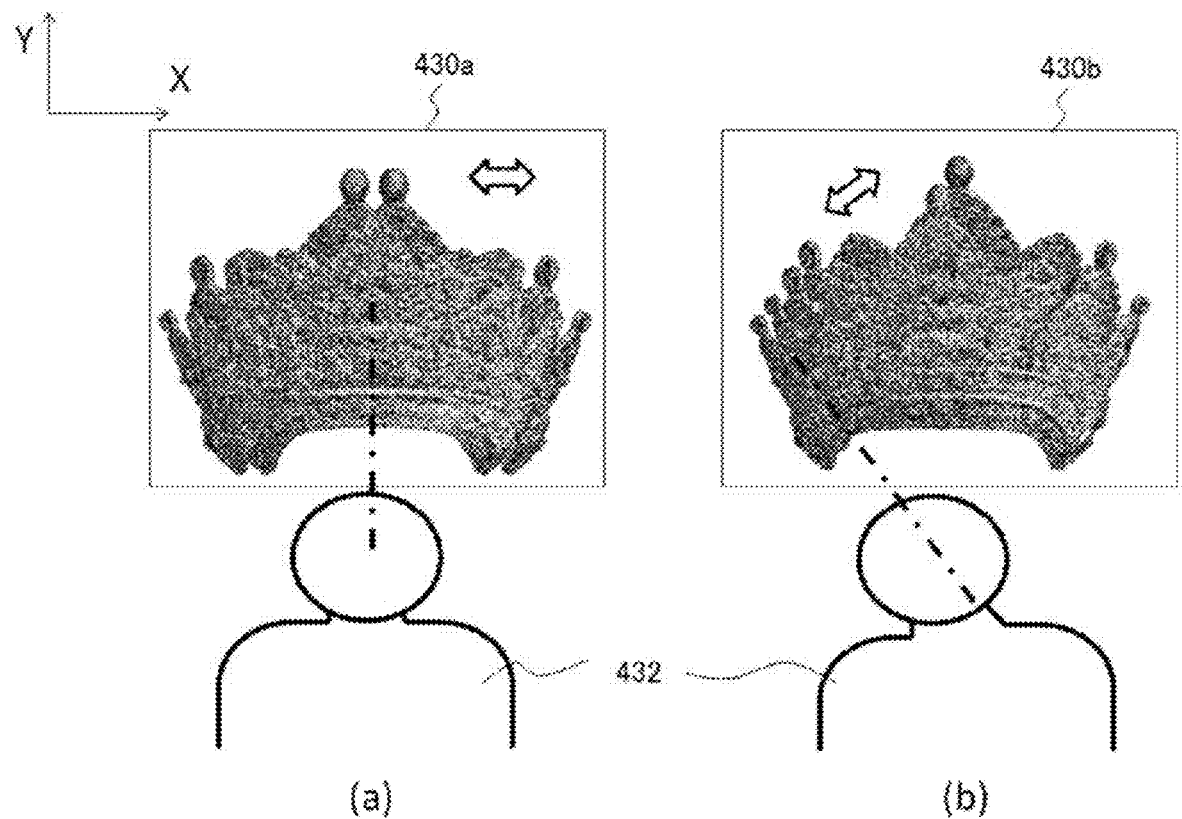
FIG. 31 is a diagram schematically illustrating an example of a change in display image caused by a tilt of the head of a viewer.

FIG. 31 schematically illustrates an example of a change in display image caused by a tilt of the head of the viewer. When the head of a viewer 432 is upright and the axis of the head aligns with the Y-axis direction of a display screen 430a as in (a), the image of the object in the left and right display images is displaced in the X-axis direction by an amount corresponding to the parallax. This situation is the same as when the original parallax images are acquired, and the object can be appropriately stereoscopically viewed. On the other hand, in a case where the head of the viewer 432 is tilted as in (b), the left and right display images are correspondingly displaced, and the displacement occurs in a direction different from the X-axis direction of a display screen 430b.

Such a change may cause holes in the image of the object or preclude appropriate stereoscopic viewing, leading to an unpleasant feeling such as motion sickness. For example, in a case where the viewer is viewing images while lying down, the display image may be excessively changed in accordance with a change in viewpoint even without an intention to come around to view the object. Additionally, human beings have the property of often having the head slightly tilted in spite of the intention to have the head upright. In a case where such a tilt prevents the image from being appropriately displayed, the viewer may feel uncomfortably. In other words, the exactly correct posture needs to be assumed to view original, appropriate images.

Figure 32:
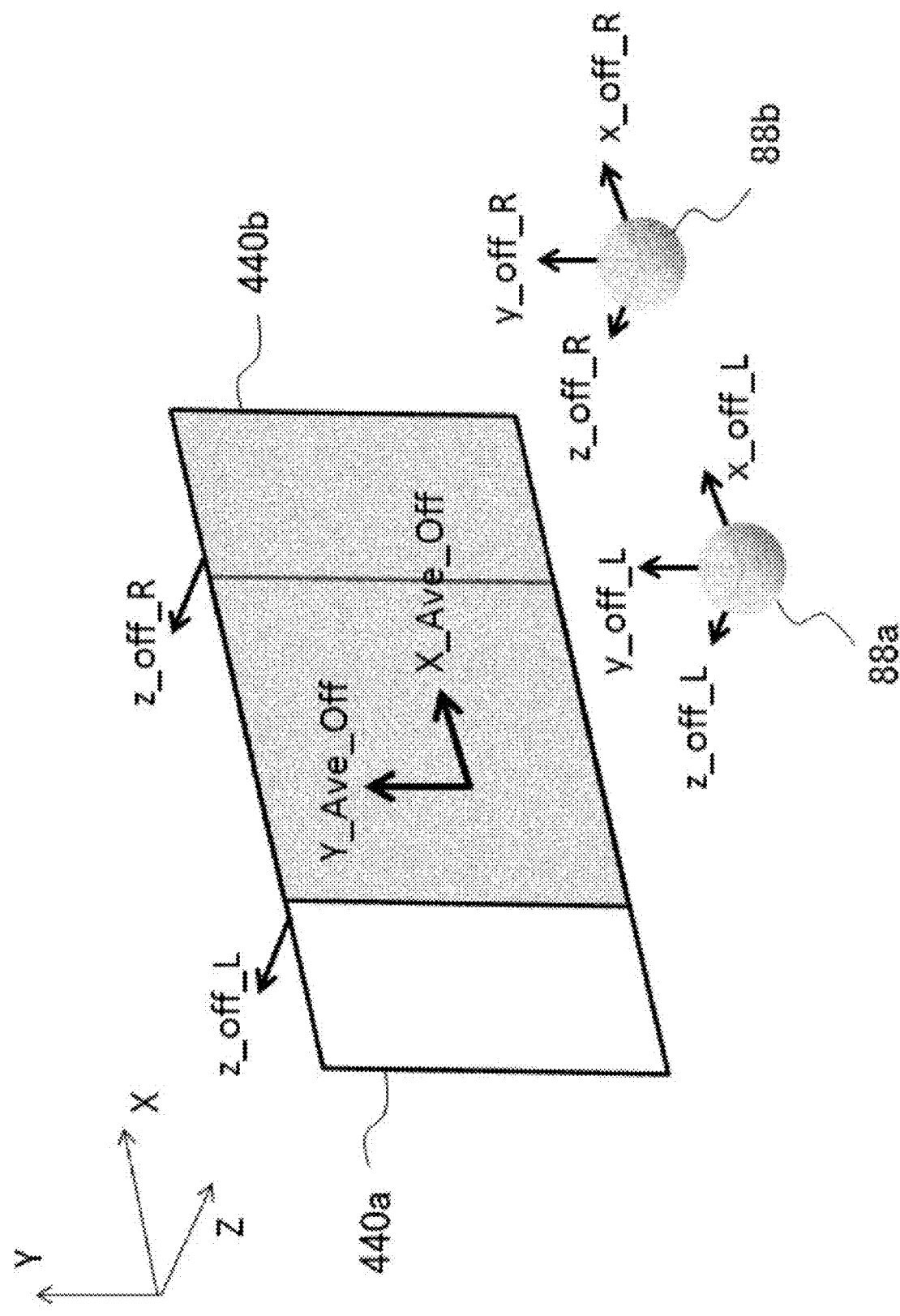
FIG. 32 is a diagram illustrating a method for adjusting the position of a map screen in accordance with the positions of the viewpoints according to the present embodiment.

To improve such circumstances, the original image manipulating section 254 adjusts the position of the map screen in both the X-axis direction and the Y-axis direction at suitable timings to inhibit excessive changes in the display image unintended by the viewer. FIG. 32 is a diagram illustrating a method for adjusting the position of the map screen in accordance with the position of the viewpoint. FIG. 32 is a perspective view illustrating a position relationship between both eyes and the map screen. A left-eye image 440a and a right-eye image 440b are generated on the map screen. Note that the left-eye image 440a and the right-eye image 440b are actually left and right image reference vector maps but are hereinafter referred to as the left-eye image 440a and the right-eye image 440b.

On the other hand, the original image manipulating section 254 sequentially receives, from the cameras 70a and 70b (see FIG. 6) having acquired the original images, the amounts of displacement of the viewpoints 88a and 88b of the viewer in the X-, Y-, and Z-axis directions. As illustrated in FIG. 32, the amount of displacement of the left viewpoint 88a in each axis direction is represented as (x_off_L, y_off_L, z_off_L), and the amount of displacement of the right viewpoint 88b in each axis direction is represented as (x_off_R, y_off_R, z_off_R). As described above, with respect to the amount of displacement in the Z-axis direction (z_off_R, z_off_L), the left-eye image 440a and the right-eye image 440b are displaced in the same direction by the same amount. This allows the image of the object to be expressed without making the calculation method as described with reference to FIGS. 11 to 14 useless even in a case where the viewer moves forward.

Furthermore, as described above, the left-eye image 440a and the right-eye image 440b are similarly moved in the X-axis direction and the Y-axis direction according to movement of the viewpoint so as to suppress adverse effects of a tilt of the head or the like. At this time, in a case where the amounts of displacement in the X-axis direction and the Y-axis direction are represented as X_Ave_off and Y_Ave_off, the amounts are determined as follows.

$$X\_Ave\_off=(x\_off\_R+x\_off\_L)/2$$

$$Y\_Ave\_off=(y\_off\_R+y\_off\_L)/2$$

That is, the images are moved in the same direction by an amount equal to the average value of amounts of displacement of both viewpoints. The left-eye image 440a and the right-eye image 440b are similarly moved in order to maintain the viewing frustum used to acquire the original images.

For movement of the images described above, in calculation of displacement of pixels described with reference to FIGS. 11 to 14, the amounts of displacement corresponding to movement of the images may be subtracted from the amounts of displacement (x_off, y_off) of the left and right viewpoints in the X-axis direction and the Y-axis direction. That is, this can be expressed separately for the left-eye image and for the right-eye image as follows.

The amount of displacement of the left-eye viewpoint:

$$(X\_off\_L-X\_Ave\_off, Y\_off\_L-Y\_Ave\_off)$$

The amount of displacement of the right-eye viewpoint:

$$(X\_off\_R-X\_Ave\_off, Y\_off\_R-Y\_Ave\_off)$$

Figure 33:
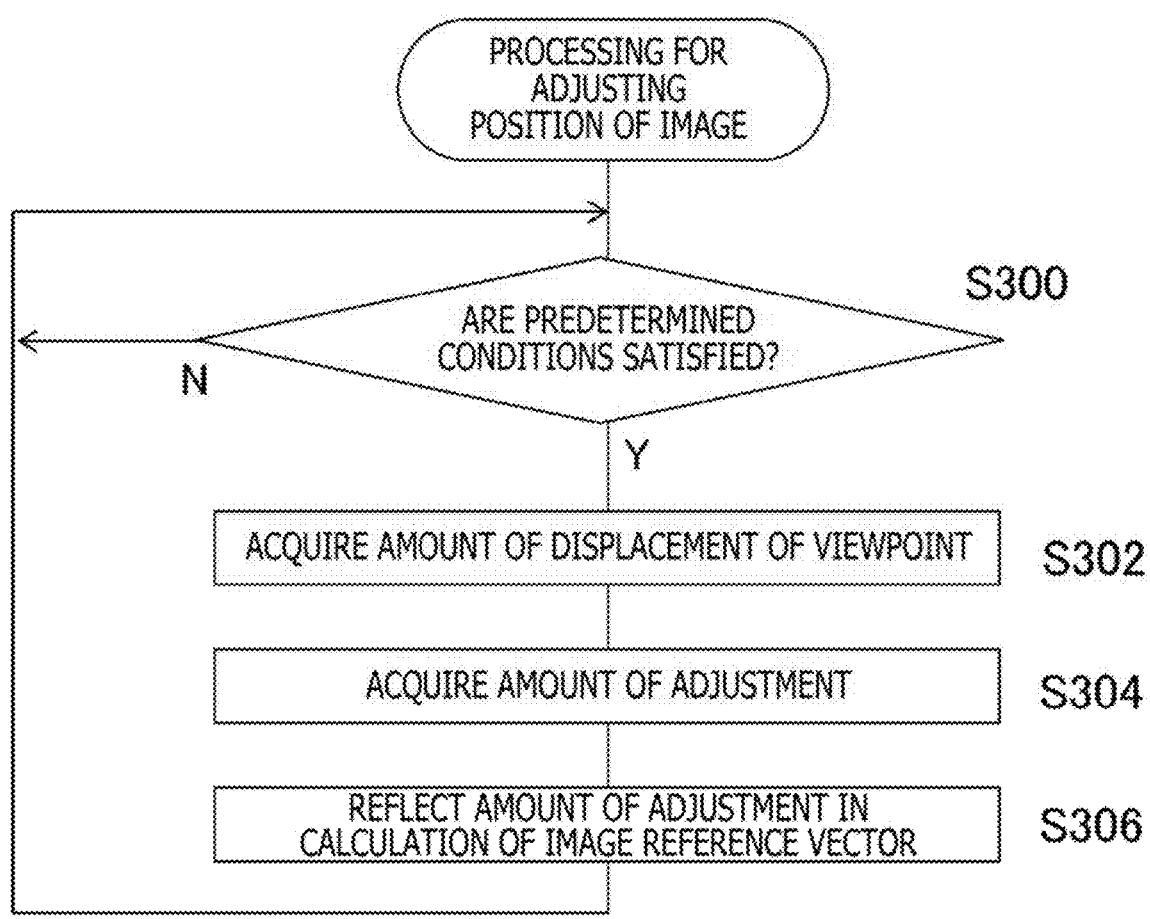
FIG. 33 is a flowchart illustrating a processing procedure in which the original image manipulating section of the image generating apparatus according to the present embodiment adjusts the position of an image on an XY plane according to the position of the head of the viewer.

In a case where (X_Ave_off, Y_Ave_off), which is the amount of adjustment of the image, is constantly varied according to movement of the viewpoint, the parallax in the image of the object may be incorrect, making the viewer feel uncomfortable. Thus, the amount of adjustment is desirably updated at a restrictive and appropriate timing. FIG. 33 is a flowchart illustrating a processing procedure in which the original image manipulating section 254 of the image generating apparatus 200 adjusts the position of an image on an XY plane according to the position of the head of the viewer. With the display image being output in accordance with the processing procedure illustrated in FIG. 8, the flowchart is implemented in parallel with the output of the display image.

In such a state, whether a predetermined condition for performing adjustment is satisfied is monitored (S300). Here, the predetermined condition may be such an instruction input provided by an observer, a switching timing in an aspect in which the display image is switched among a plurality of still images for display, or a switching timing at which a scene is switched in an aspect in which moving images are displayed. In a case where the condition is an instruction input provided by the observer, any of general input methods may be utilized, such as assignment of a function for the instruction input to a predetermined input means of an input apparatus not illustrated.

In this case, the position and posture acquiring section 250 also acquires a signal from the input apparatus and supplies the signal to the original image manipulating section 254. In a case where the condition is other than the intention of the observer, the timing at which movement of the image is not noticeable as described above is suitable. The timing may be appropriately determined by the original image manipulating section 254 with reference to timeline information related to the contents of the image and included in the original image data 258. Alternatively, the original image manipulating section 254 may monitor changes in the posture of the viewer, and the condition may be a timing when the original image manipulating section 254 determines that stability has been achieved after occurrence of a change of a predetermined amount or larger.

Changes in the posture of the viewer can be acquired from measured values from the motion sensor built in the head-mounted display. In a case where the display apparatus is a 3D television receiver, an unillustrated imaging apparatus that captures images of the viewer may be separately provided, and captured images may be analyzed using a common method to acquire changes in posture. For example, the stability is determined to be obtained when a posture resulting from a significant change has lasted for a predetermined time since detection of the change, such a significant change in posture occurs, for example, when the viewer lies down. As the condition in S300, any one or two or more of the above-described examples may be employed. The monitoring is continued (N in S300) until the condition is satisfied.

When the condition is satisfied (Y in S300), the amounts of displacement (x_off_R, y_off_R) and (x_off_L, y_off_L) of the current viewpoints from the base points are acquired (S302). Then, the average value of the amounts of displacement of the left and right viewpoints is calculated for each of X- and Y-axis components to obtain the amount of adjustment of the image (X_Ave_off, Y_Ave_off) (S304). Then, in the subsequent calculation of image reference vectors, a value obtained by subtracting the amount of adjustment of the image from the amounts of displacement of the left and right viewpoints is used as a new amount of displacement (S306). This substantially corresponds to substantial movement of the image on the XY plane, and the subsequent base points are the viewpoints used when the amounts of displacement are obtained in S302.

In the processing in S306, instantaneously changing the position of the image in one frame may cause the viewer to miss a reference for stereoscopic viewing and to have an unpleasant feeling. Thus, the processing in S306 may be gradually executed over a plurality of frames to cause a slow change in the image. For example, a time for M frames is assumed to be spent from the time of satisfaction of the condition in S300 until adjustment is ended. In this case, the ratio of the amount of adjustment in the n-th frame (n is a natural number of 1 or more and M or less) is set as follows.

$$\text{ratio}=(n/m)^{1/8}$$

The ratio is used to set the amounts of displacement of the left and right viewpoint in the n-th frame as follows.
The amount of displacement of the left viewpoint:

$$((X\_off\_L-X\_Ave\_off)*\text{ratio}+X\_off\_L*(1-\text{ratio}),$$

$$(Y\_off\_L-Y\_Ave\_off)*\text{ratio}+Y\_off\_L*(1-\text{ratio}))$$

The amount of displacement of the right viewpoint:

$$((X\_off\_R-X\_Ave\_off)*\text{ratio}+X\_off\_R*(1-\text{ratio}),$$

$$(Y\_off\_R-Y\_Ave\_off)*\text{ratio}+Y\_off\_R*(1-\text{ratio}))$$

At the M-th frame from the timing when the condition is satisfied, ratio=1, and the adjustment with the amount of adjustment determined in S304 is completed.

For the number M of frames with which the adjustment is completed, an appropriate value may be experimentally set or more adaptively determined, for example, on the basis of the amounts of displacement of the viewpoints at the time of satisfaction of the condition in S300. For example, in a case where the amounts of displacement are currently large, the amount of adjustment of the image is also large, and thus the number M of frames is increased to perform adjustment over a relatively long time. For such gradual adjustment, the viewer may be allowed to recognize that adjustment is in execution. For example, during the period of adjustment, an icon indicating this may be displayed in any portion of the display image or an attribute of the object to be displayed such as the color of the object may be changed.

In a case where the adjustment is performed on the basis of an instruction input from the viewer, the above-described operation can be performed to indicate that the instruction input has been accepted to provide the viewer with a sense of ease. Once the processing in S306 is executed to end the position adjustment of the image, the processing returns to S300 to monitor again whether the predetermined condition is satisfied. In a case where the condition is satisfied, the adjustment processing in S302 to S306 is executed.

According to the present embodiment described above, in the system using the left and right parallax images to implement stereoscopic viewing, previously generated original images are changed according to the movement or direction of the viewpoints to obtain a display image. For a conversion reflecting movement of the viewpoints, the image reference vector map indicating a difference from a position in the original images is used instead of the original images themselves. Accordingly, the conversion manipulation on the original images is performed only when the pixel values for the display image are finally determined. This inhibits degradation of image quality of the original images.

At this time, the recursive filter is implemented by synthesizing the color values obtained from the original images using the image reference vector map generated for the current frame with the color values of the pixels previously expressing the same object. Accordingly, in portions with significant discontinuity due to a great variation in an image reference vector, a great change in a Z value, and reference to another original image, flickers can be suppressed that are caused by a significant change and change-back in the pixel value due to minor changes in viewpoint.

Additionally, at the time of image display, the image plane on which an image reference vector map is generated is adjusted according to XY components of movement of the viewpoints. Thus, even with wagging or tilting of the head unnoticed by the viewer or postural imbalance such as the viewer resting the cheek on the hand or lying down, the viewer can be allowed to favorably stereoscopically view original high-quality images. That is, the viewpoints, used as base points, can be varied to increase the types of postures that the viewer is permitted to assume in realizing appropriate stereoscopic viewing. The adjustment is performed in accordance with the instruction input from the viewer or at the timing when the contents of the image are switched. Thus, the viewer can be prevented from failing to recognize a sudden change during stereoscopic viewing and having unpleasant feeling. Furthermore, the adjustment is gradually performed over a time for a number of frames to allow seamless achievement of changes in situation resulting from the adjustment.

The present invention has been described on the basis of the embodiment. The embodiment is illustrative, and those skilled in the art appreciate that many variations of combinations of components or processes of the embodiment can be made and that such variations are within the scope of the present invention.

REFERENCE SIGNS LIST

100 Head-mounted display, 200 Image generating apparatus, 222 CPU, 224 GPU, 226 Main memory, 250 Position and posture acquiring section, 252 View screen control section, 254 Original image manipulating section, 256 Original image data storage section, 258 Original image data, 260 Parallax value image data, 262 Reference data storage section, 264 Z buffer, 266 Image reference vector map, 267 Color map, 268 Display image generating section, 270 Output section

INDUSTRIAL APPLICABILITY

As described above, the present invention can be utilized for various information processing apparatuses such as a game apparatus, an image display apparatus, an image reproduction apparatus, and a personal computer, an information processing system including any of the apparatuses, and the like.

The invention claimed is:

1. An image generating apparatus using a pair of original images acquired from left and right different viewpoints to generate an image making an object stereoscopically visible, the image generating apparatus comprising:
   an original image manipulating section adjusting a position of an image plane in a virtual space according to movement of viewpoints of a user and calculating displacement of pixels in the original images such that the object is fixed in the virtual space with respect to the movement of the viewpoints to generate, on the image plane, an image corresponding to the viewpoints at each of points in time;
   a display image generating section referencing, in the image corresponding to the viewpoints at each of the points in time, a color value at a position corresponding to each of the pixels in a display image to determine the color value for the pixel; and
   an output section outputting data of the display image,
   wherein the original image manipulating section monitors a change in a posture of the user and starts adjusting the image plane at a timing when the original image manipulating section determines, on a basis of a predetermined reference, that stability of the posture has been obtained.

2. The image generating apparatus according to claim 1, wherein
   the original image manipulating section displaces the image plane by an amount of displacement identical to an amount of displacement of a component parallel to the image plane, the amount of displacement being included in amounts of displacement of the viewpoints from predetermined base points, and displaces the image plane in a direction identical to a direction of the component.

3. The image generating apparatus according to claim 1, wherein
   the original image manipulating section starts adjusting the image plane at a timing when the original image manipulating section acquires an instruction input related to movement from the user.

4. The image generating apparatus according to claim 1, wherein
   the original image manipulating section starts adjusting the image plane at a timing determined on a basis of contents of the original images.

5. The image generating apparatus according to claim 1, wherein
   the original image manipulating section displaces the image plane over a predetermined number of frames from a timing when the original image manipulating section determines to displace the image plane.

6. An image generating method using a pair of original images acquired from left and right different viewpoints to generate an image making an object stereoscopically visible, the image generating method comprising:
   monitoring a change in a posture of the user;
   determining a timing when the posture is stable;
   adjusting, at the timing, a position of an image plane in a virtual space according to movement of viewpoints of the user and calculating displacement of pixels in the original images such that the object is fixed in the virtual space with respect to the movement of the viewpoints to generate, on the image plane, an image corresponding to the viewpoints at each of points in time;
   referencing, in the image corresponding to the viewpoints at each of the points in time, a color value at a position corresponding to each of the pixels in a display image to determine the color value for the pixel; and
   outputting data of the display image.

7. A non-transitory computer readable medium having stored thereon a computer program that uses a pair of original images acquired from left and right different viewpoints to generate an image making an object stereoscopically visible, the computer program for a computer; comprising:
   by an original image manipulating section, adjusting a position of an image plane in a virtual space according to movement of viewpoints of a user and calculating displacement of pixels in the original images such that the object is fixed in the virtual space with respect to the movement of the viewpoints to generate, on the image plane, an image corresponding to the viewpoints at each of points in time;
   by a display image generating section, referencing, in the image corresponding to the viewpoints at each of the points in time, a color value at a position corresponding to each of the pixels in a display image to determine the color value for the pixel; and
   by an output section, outputting data of the display image,
   wherein the original image manipulating section monitors a change in a posture of the user and starts adjusting the image plane at a timing when the original image manipulating section determines, on a basis of a predetermined reference, that stability of the posture has been obtained.

* * * * *